（12） United States Patent
Hamasaki et al.

(10) Patent No.: US 11,955,662 B2
(45) Date of Patent: Apr. 9, 2024

(54) SEPARATOR FOR ELECTRIC STORAGE DEVICE

(71) Applicants: ASAHI KASEI KABUSHIKI KAISHA, Tokyo (JP); CELGARD, LLC, Charlotte, NC (US)

(72) Inventors: Shinya Hamasaki, Tokyo (JP); Masaki Takahashi, Tokyo (JP); Shohei Mori, Tokyo (JP); Yoshiyuki Ishii, Tokyo (JP); Kenji Ebara, Tokyo (JP); Changqing Adams, Fort Mill, SC (US)

(73) Assignees: Asahi Kasei Kabushiki Kaisha, Tokyo (JP); Celgard, LLC, Charlotte, NC (US)

( * ) Notice: Subject to any disclaimer, the term of this patent is extended or adjusted under 35 U.S.C. 154(b) by 224 days.

(21) Appl. No.: 16/647,477

(22) PCT Filed: Nov. 19, 2018

(86) PCT No.: PCT/US2018/061719
§ 371 (c)(1),
(2) Date: Mar. 13, 2020

(87) PCT Pub. No.: WO2019/103947
PCT Pub. Date: May 31, 2019

(65) Prior Publication Data
US 2021/0367309 A1        Nov. 25, 2021

Related U.S. Application Data

(60) Provisional application No. 62/588,996, filed on Nov. 21, 2017, provisional application No. 62/588,967, (Continued)

(51) Int. Cl.
*H01M 50/491*        (2021.01)
*B29C 48/00*         (2019.01)
(Continued)

(52) U.S. Cl.
CPC ....... *H01M 50/491* (2021.01); *B29C 48/0018* (2019.02); *B29C 48/08* (2019.02);
(Continued)

(58) Field of Classification Search
CPC ............. H01M 50/491; H01M 50/406; H01M 50/417; H01M 50/44; H01M 10/0525;
(Continued)

(56) References Cited

U.S. PATENT DOCUMENTS 8,409,746 B2   4/2013   Yong et al.
9,666,851 B2   5/2017   Ha et al.
(Continued)

FOREIGN PATENT DOCUMENTS

JP      H07-188440 A1    7/1995
JP      2003-192814 A1   7/2003
(Continued)

OTHER PUBLICATIONS

Written Opinion and Search Report dated May 23, 2020; from counterpart PCT Application No. PCT/US2018/061719.
(Continued)

*Primary Examiner* — Nathan L Van Sell
(74) *Attorney, Agent, or Firm* — Hammer & Associates, P.C.

(57)  ABSTRACT

The present invention provides (I) a dry-stretched microporous membrane and a separator for an electric storage device excellent in balance among the required performances such as product safety, charge/discharge characteristics, dimension stability, energy cost, consideration to the environment, etc., (II) a separator for an electric storage device superior in product safety obtained by controlling a puncture depth of a microporous membrane comprised in the separator for an electric storage device, or/and (III) a dry-stretched microporous membrane and a separator for an electric power storage
(Continued)

device excellent in product safety realized by controlling a porosity and a puncture strength of a thin microporous membrane.

29 Claims, 3 Drawing Sheets

Related U.S. Application Data filed on Nov. 21, 2017, provisional application No. 62/589,001, filed on Nov. 21, 2017.

(51) Int. Cl.
| | |
|---|---|
| *B29C 48/08* | (2019.01) |
| *B29C 71/02* | (2006.01) |
| *B29K 23/00* | (2006.01) |
| *B29L 31/00* | (2006.01) |
| *B29L 31/34* | (2006.01) |
| *H01M 50/406* | (2021.01) |
| *H01M 50/417* | (2021.01) |
| *H01M 50/44* | (2021.01) |

(52) U.S. Cl.
CPC ........... *B29C 71/02* (2013.01); *H01M 50/406* (2021.01); *H01M 50/417* (2021.01); *H01M 50/44* (2021.01); *B29C 2071/022* (2013.01); *B29K 2023/12* (2013.01); *B29L 2031/3468* (2013.01); *B29L 2031/755* (2013.01)

(58) Field of Classification Search
CPC ............. H01M 50/403; H01M 50/489; H01M 50/494; H01M 50/414; H01M 2220/20; H01M 50/411; H01M 50/449; B29C 48/0018; B29C 48/08; B29C 71/02; B29C 2071/022; B29K 2023/12; B29L 2031/3468; B29L 2031/755; Y02E 60/10

See application file for complete search history.

(56) References Cited

U.S. PATENT DOCUMENTS

| | | | |
|---|---|---|---|
| 9,741,989 | B2 | 8/2017 | Ohashi et al. |
| 2003/0104236 | A1 | 6/2003 | Nguyen et al. |
| 2005/0087487 | A1 | 4/2005 | Sakamoto et al. |
| 2016/0149181 | A1 | 5/2016 | Zhang et al. |
| 2018/0083247 | A1* | 3/2018 | Seo ................. B32B 27/32 |

FOREIGN PATENT DOCUMENTS

| | | | |
|---|---|---|---|
| JP | 2005144829 | | 6/2005 |
| JP | 2008-254288 | A1 | 10/2008 |
| JP | 5065737 | A1 | 11/2012 |
| JP | 2013100487 | | 5/2013 |
| JP | 565376 | B1 | 11/2014 |
| WO | WO2013/054929 | A1 | 4/2013 |
| WO | WO-2016073580 | A1 * | 5/2016 ............. B29C 48/78 |

OTHER PUBLICATIONS

IPRP dated May 26, 2020; from counterpart PCT Application No. PCT/US2018/061719.

EP Extended Search Report received Jul. 21, 2021; from EP counterpart Application No. 18880984.2.

* cited by examiner (a)

(b)

(c)

SEPARATOR FOR ELECTRIC STORAGE DEVICE

FIELD

The present invention relates to a separator for an electric storage device.

BACKGROUND

Microporous membranes, particularly polyolefin-based microporous membranes, are widely used as microfiltration membranes, separators for batteries, separators for condensers, materials for fuel cells, etc., and particularly as separators for secondary batteries represented by lithium-ion batteries. In recent years, lithium-ion batteries have been used for applications of miniature electronic devices such as cellular phones and laptop computers, and also applied to electric vehicles including hybrid vehicles or plug-in hybrid vehicles.

Lithium-ion batteries used in electric vehicles are generally large in size and have high energy capacity, so that higher safety is required. Further, lithium-ion batteries used in electric vehicles are required to have higher output characteristics than conventional batteries in order to draw a lot of energy in a short time. Furthermore, a battery with high energy density is also required, and accordingly, a thinner separator is required. Needless to say, the lithium-ion batteries for electric vehicles tend to be used for a long time under severe conditions as compared with miniature electronic devices, and therefore the required level for product safety or long-term reliability (lifetime characteristics) also increases. Namely, in the future, lithium-ion batteries used in electric vehicles are strongly required to have both high energy output and high product safety, and in particular, separators are required to have such characteristics as high strength (for example, puncture strength, tensile strength, etc.), low shrinkage ratio, high heat resistance, low electrical resistance, etc.

Much research and development have been conducted with the aim of providing a microporous membrane capable of coping with such circumstances. In particular, the representative technologies for strengthening a microporous membrane include, for example, 1) reinforcement of a membrane using inorganic fillers, 2) reinforcement of a membrane using cellulose nanofibers, 3) reinforcement of a microporous membrane by crosslinking the membrane polymer after forming it, and 4) formation of a microporous membrane using ultra-high molecular weight polymers, etc.

The above 1), however, has a problem of high air permeability resistance, since the membrane is pore-opened at the interface between fillers and polymers and thereby through-pores cannot be obtained. In the above 2), there are problems that it is difficult for a cellulose nanofiber to micro-disperse into a polyolefin, thereby sufficient reinforcing effect cannot be obtained, and protrusions such as fish eye are generated. According to the above 3), although strengthening of the membrane can be attained, a membrane dimension varies due to a cross linking reaction, and therefore it is not suitable as a separator for lithium-ion batteries in which a precise dimension is required.

The membrane described in the above 4) is generally manufactured by a wet pore opening method of dissolving an ultra-high molecular weight polyethylene and a plasticizer such as a liquid paraffin, etc., into a solvent, followed by pore opening upon stretching of the membrane, and has a problem of being inferior in heat resistance, air permeability resistance, dimension stability or productivity, despite being superior in membrane strength, as compared to a polypropylene microporous membrane manufactured by a conventional dry pore opening method.

There has also been proposed a method of utilizing an ultra-high molecular weight polypropylene to manufacture the microporous membrane described in the above 4) (PTLs 1 and 2).

Generally, a microporous membrane is formed by melt extrusion of a resin followed by stretching thereof. The method of pore-formation in the resin film is largely either dry methods or wet methods.

Dry methods include methods of forming pores by subjecting an unstretched sheet including non-compatible particles such as inorganic particles and a polyolefin, to stretching and extraction to peel off the heterogeneous material interface and form pores, as well as lamellar pore opening method and a β-crystal pore opening method.

Wet methods include methods of adding a pore-forming material (extractable matter) such as a plasticizer to a polyolefin and dispersing it, and then extracting the extractable matter with a solvent after sheet formation to form pores, if necessary carrying out stretching before and/or after the extraction.

Physical properties of a microporous membrane have been a subject of study with the aim of using the microporous membrane produced by dry methods as separators for secondary batteries (PTLs 3 to 5).

PTL 3 describes, from the viewpoint of balance of physical properties of a separator for a secondary battery, a composite microporous membrane obtained by a dry lamellar pore opening method, having a porosity of 30-80% as well as a microporous polypropylene layer and a microporous polyethylene layer, and a porosity of the microporous polypropylene layer which is larger than that of the microporous polyethylene layer.

In PTL 4 describes, from the viewpoint of porosity and mechanical strength, a microporous sheet formed from a mixture of an aliphatic polyolefin and a thermoplastic olefin elastomer and the obtained microporous sheet subjected to a dry lamellar pore opening method.

PTL 5 describes a microporous PP film obtained by biaxial stretching in a β-crystal pore opening method, having a film thickness of 10 to 30 μm, a porosity of 55 to 85%, an air permeability resistance of 70 to 300 seconds/100 ml, a puncture strength of 0.18 to 0.50N/1 μm thickness, a transverse direction (TD) heat shrinkage factor of 12% (60 minutes at 135° C.), and a tensile strength of 60 to 200 MPa. The microporous membrane described in PTL 5 and obtained according to the β-crystal pore opening method largely has isotropicity due to crystal transition.

A strength of a microporous membrane has been a subject of study with the aim of using a microporous membrane produced by a wet method as a separator for a secondary battery (PTL 6). PTL 6 describes microporous polyolefin films having various degrees of orientation in the film thickness direction, and puncture elongation of 2.2 to 2.4 mm, from the viewpoint of both strength at break and puncture strength.

CITATION LIST

Patent Literature

[PTL 1] Japanese Patent Publication No. 5653761
[PTL 2] Japanese Patent Publication No. 5065737

[PTL 3] Japanese Unexamined Patent Publication No. 2008-254288
[PTL 4] Japanese Unexamined Patent Publication No. 2003-192814
[PTL 5] WO2013/54929
[PTL 6] Japanese Unexamined Patent Publication No. 1995 (H7)-188440

SUMMARY

Technical Problem

In recent years, lithium-ion secondary batteries have been incorporated in miniature electronic devices or electric vehicles, and have come to be used even in harsh environments. In this regard, separators that include microporous films are also in need of still further technological improvement in the higher level of character requirements such as heat resistance, dimension stability, air permeability, voltage resistance, etc., in addition to strength.

The increase in a strength of the microporous film has been previously requested from the viewpoint of product safety or improvement of the energy density of batteries, however, the increase in the strength contradicts with porosity and air permeability resistance dominating charge/discharge characteristics. Namely, it is of importance to realize a higher strength of the microporous membrane in some way without reducing porosity as well as air permeability resistance.

Furthermore, it is also of importance to manufacture, from the viewpoint of energy cost and consideration to the environment, a microporous membrane by a dry pore opening method without using a solvent, having a strength as high as or higher than that of a wet pore opening membrane.

However, a porosity and thickness of a polypropylene containing membrane manufactured by the wet pore opening method described in PTL 1 are not specified, and the invention of the microporous membrane having a high strength is hard to be completed. PTL 2 describes that a laminated microporous membrane comprises an ultra-high molecular weight polypropylene layer and polyethylene layer obtained by a dry pore opening method, and a thickness, porosity, strength, etc., thereof are disclosed, however, there still remains room for improvement in terms of future property requirements of a separator for an electric storage device.

Furthermore, the microporous membranes obtained by the dry method described in PTLs 3 to 5 or the wet method described in PTL 6 have some room for improvement regarding safety of the separator and electric storage device comprising thereof.

In view of the above circumstances, it is an object of the first embodiment of the present invention to provide a separator for an electric storage device, which are excellent in balance among the performance requirements such as product safety, charge/discharge characteristic, dimension stability, energy cost, consideration to the environment, etc.

An object of the second embodiment of the present invention is to provide a separator for an electric storage device having excellent product safety.

An object of the third embodiment of the present invention is to provide a separator for an electric storage device which has excellent product safety.

Solution to Problem

The present inventors have found that the aforementioned problem can be solved by designing a separator comprising a microporous membrane having a specific molecular weight or morphology of the membrane and have thereupon completed the first embodiment of this invention.

In addition to above, the present inventors have found that the aforementioned problem can be solved by controlling a puncture depth of a microporous membrane comprised in a separator for an electric storage device and have thereupon completed the second embodiment of this invention.

Furthermore, the present inventors have found that the aforementioned problem can be solved by controlling a porosity and a puncture strength of a microporous membrane comprised in a separator for an electric storage device, when produced into the form of a thin membrane, and have thereupon completed the third embodiment of this invention.

Specifically, the present invention is as follows.

[1]
A separator for an electric storage device, comprising a microporous membrane comprising a polypropylene resin (A) and a thermoplastic elastomer (B), wherein the microporous membrane has the following regions:
(i) a polymeric matrix comprising the polypropylene resin (A) and the thermoplastic elastomer (B);
(ii) fibrils comprising the polypropylene resin (A) and extending in a Machine Direction (MD) of the microporous membrane from the polymeric matrix; and
(iii) pores between the fibrils; and
wherein a Melt Flow Rate (MFR) of the microporous membrane is 1.5 g/10 minutes or less.

[2]
A separator for an electric storage device, comprising a microporous membrane comprising a polypropylene resin (A) and a thermoplastic elastomer (B), wherein the microporous membrane has the following regions:
(i) a polymeric matrix comprising the polypropylene resin (A) and the thermoplastic elastomer (B);
(ii) fibrils comprising the polypropylene resin (A) and extending in a Machine Direction (MD) of the microporous membrane from the polymeric matrix; and
(iii) pores between the fibrils; and
wherein a Melt Flow Rate (MFR) of the polypropylene resin (A) is 1.0 g/10 minutes or less.

[3]
A separator for an electric storage device, comprising a microporous membrane comprising a polypropylene resin (A) and a thermoplastic elastomer (B), wherein the microporous membrane has the following regions:
(i) a polymeric matrix comprising the polypropylene resin (A) and the thermoplastic elastomer (B);
(ii) fibrils comprising the polypropylene resin (A) and extending in a Machine Direction (MD) of the microporous membrane from the polymeric matrix; and
(iii) pores between the fibrils; and
wherein the thermoplastic elastomer (B) forms a region in which a ratio (MD/TD) of a length in the MD to a length in a Transverse Direction (TD) is 1.5 or more.

[4]
The separator according to [3], wherein the region of the thermoplastic elastomer (B) is oriented along the MD of the microporous membrane.

[5]
The separator according to [3] or [4], wherein the ratio (MD/TD) of a length in the MD to a length in a Transverse Direction (TD) is 10.0 or less.

[6]
The separator according to any one of [1] to [5], wherein the thermoplastic elastomer (B) is free of propylene.
[7]
The separator according to any one of [1] to [6], wherein a weight ratio of the polypropylene resin (A) to the thermoplastic elastomer (B) is 99.9:0.1 to 80:20.
[8]
The separator according to any one of [1] to [7], wherein the thermoplastic elastomer (B) is present in the polymeric matrix, but is not present in the fibrils.
[9]
The separator according to any one of [1] to [8], wherein, in the case of a crystalline, thermoplastic elastomer in which a hard segment of the thermoplastic elastomer (B) is crystalline, a crystalline melting point peak of the hard segment is 50 to 110° C., or in the case of an amorphous, thermoplastic elastomer in which a hard segment of the thermoplastic elastomer (B) is amorphous, a glass-transition temperature of the hard segment is 30 to 110° C.
[10]
The separator according to any one of [1] to [9], wherein a Melt Flow Rate (MFR) of the thermoplastic elastomer (B) is 2.0 g/10 minutes or more.
[11]
The separator according to any one of [1] to [10], wherein the thermoplastic elastomer (B) is ethylene/α-olefin copolymer.
[12]
The separator according to any one of [1] to [11], wherein a porosity of the microporous membrane is 30 to 80%.
[13]
The separator according to any one of [1] to [12], wherein the separator has an air permeability resistance of 100 to 500 seconds/100 ml, provided that the air permeability resistance is a value obtained by multiplying an actual measured air permeability resistance of the separator by 14 m after dividing the actual measured air permeability resistance by a thickness of the separator.
[14]
The separator according to any one of [1] to [13], wherein the separator has a puncture strength of 400 gf or more, provided that the puncture strength is a value obtained by multiplying an actual measured puncture strength of the separator by 14 μm after dividing the actual measured puncture strength by a thickness of the separator.
[15]
The separator according to any one of [1] to [14], wherein a Melt Flow Rate (MFR) of the microporous membrane is 0.1 g/10 minutes or more.
[16]
The separator according to any one of [1] to [15], wherein a Melt Flow Rate (MFR) of the polypropylene resin (A) is 0.1 g/10 minutes or more.
[17]
The separator according to any one of [1] to [16], wherein the separator comprises a microporous multi-layered membrane in which the microporous membrane comprising the polypropylene resin (A) and the thermoplastic elastomer (B) and a microporous membrane comprising a polyethylene as a major component are laminated.
[18]
The separator according to [17], wherein a density of the polyethylene for the microporous membrane comprising a polyethylene as a major component is 0.96 g/cm$^3$ or more, and a Melt Flow Rate (MFR) of the microporous membrane comprising a polyethylene as a major component is 0.6 g/10 minutes or less.

[19]
The separator according to any one of [17] or [18], wherein the separator comprises not only the microporous membrane comprising the polypropylene resin (A) and the thermoplastic elastomer (B), but also the microporous multi-layered membrane.
[20]
A method of producing the separator according to any one of [1] to [19], comprising the steps of:
forming a raw film by means of a circular die extrusion method; and
annealing the raw film, before heating and stretching the raw film.
[21]
A separator for an electric storage device, comprising a microporous membrane, wherein the microporous membrane comprises a polyolefin resin as a major component, and wherein the separator has a maximum-stress puncture depth of 4.0 mm or more at a maximum puncture strength in a puncture test of the separator.
[22]
The separator according to [21], wherein the maximum-stress puncture depth is from 5.0 mm to 20.0 mm.
[23]
The separator according to [21] or [22], wherein the maximum puncture strength is 20 gf/μm or more.
[24]
The separator according to any one of [21] to [23], wherein a puncture strength of the microporous membrane has at least two maximum values in a depth-strength curve of the puncture test.
[25]
The separator according to [24], wherein the maximum puncture strength is at least one of the at least two maximum values in the depth-strength curve.
[26]
The separator according to any one of [21] to [25], wherein the polyolefin resin is a polypropylene resin.
[27]
The separator according to any one of [21] to [26], wherein a Melt Flow Rate (MFR) of the microporous membrane is 1.4 g/10 minutes or less.
[28]
The separator according to any one of [21] to [27], wherein a Melt Flow Rate (MFR) of the microporous membrane is 0.1 g/10 minutes or more.
[29]
The separator according to any one of [21] to [28], wherein an average longest pore diameter of the microporous membrane is from 100 nm to 2000 nm.
[30]
The separator according to any one of [21] to [29], wherein a pore diameter ratio (a/b) of an average longest pore diameter (a) of the microporous membrane to a pore diameter (b) perpendicular to the average longest pore diameter (a) is from 1.5 to 30.
[31]
The separator according to any one of [21] to [30], wherein longest pore diameters of the microporous membrane are arranged in one direction.
[32]
The separator according to any one of [21] to [31], wherein the maximum puncture strength is 50 gf/μm or less.
[33]
The separator according to any one of [21] to [32], wherein the microporous membrane comprises the polyolefin resin, as well as at least one selected from the group consisting of a thermoplastic elastomer, a copolymer having a branched chain, and a copolymer having a conjugated double bond.

[34]

The separator according to any one of [21] to [32], wherein the microporous membrane comprises at least one selected from the group consisting of:
- an ethylene/α-olefin copolymer different from the polyolefin resin;
- a propylene/α-olefin copolymer different from the polyolefin resin;
- a styrene/olefin copolymer different from the polyolefin resin; and
- a polypropylene elastomer different from the polyolefin resin.

[35]

The separator according to any one of [21] to [34], wherein the microporous membrane has the following regions:
(i) a polymeric matrix comprising the polyolefin resin;
(ii) fibrils comprising the polyolefin resin and extending in a Machine Direction (MD) of the microporous membrane from the polymeric matrix; and
(iii) pores between the fibrils.

[36]

A separator for an electric storage device, comprising a microporous membrane,
wherein the microporous membrane comprises:
(A) a polyolefin resin as a major component; and
(B) at least one selected from the group consisting of an ethylene/α-olefin copolymer different from the polyolefin resin, a propylene/α-olefin copolymer different from the polyolefin resin, a styrene/olefin copolymer different from the polyolefin resin, and a polypropylene elastomer different from the polyolefin resin,
wherein an average longest pore diameter of the microporous membrane is from 100 nm to 2000 nm, and
wherein a Melt Flow Rate (MFR) of the microporous membrane is 1.4 g/10 minutes or less.

[37]

The separator for an electric storage device according to [36] wherein the Melt Flow Rate (MFR) of the microporous membrane is 0.1 g/10 minutes or more.

[38]

A separator for an electric storage device, comprising a microporous membrane comprising a polypropylene as a major component, wherein the microporous membrane has the following regions:
(i) a polymeric matrix comprising the polypropylene;
(ii) fibrils comprising the polypropylene and extending in a Machine Direction (MD) of the microporous membrane from the polymeric matrix; and
(iii) pores between the fibrils;
wherein a porosity of the microporous membrane is 30 to 80%, and
wherein a puncture strength of the separator is 400 gf or more, provided that the puncture strength is a value obtained by multiplying an actual measured puncture strength of the separator by 14 μm after dividing the actual measured puncture strength by a thickness of the separator.

[39]

The separator according to [38], wherein an air permeability resistance of the separator is 100 to 500 seconds/100 ml, provided that the air permeability resistance is a value obtained by multiplying an actual measured air permeability resistance of the separator by 14 μm after dividing the actual measured air permeability resistance by a thickness of the separator.

[40]

The separator according to [38] or [39], wherein the puncture strength is 700 gf or less.

[41]

The separator according to any one of [38] to [40], wherein a Melt Flow Rate (MFR) of the polypropylene is 1.0 g/10 minutes or less.

[42]

The separator according to any one of [38] to [41], wherein a Melt Flow Rate (MFR) of the polypropylene is 0.1 g/10 minutes or more.

[43]

The separator according to any one of [38] to [42], wherein a Melt Flow Rate (MFR) of the microporous membrane is 1.5 g/10 minutes or less.

[44]

The separator according to any one of [38] to [43], wherein a Melt Flow Rate (MFR) of the microporous membrane is 0.1 g/10 minutes or more.

[45]

The separator according to any one of [38] to [44], comprising:
the polypropylene; and
a thermoplastic elastomer being free of propylene.

[46]

The separator according to any one of [38] to [45], wherein the separator comprises a microporous multi-layered membrane in which the microporous membrane comprising a polypropylene as a major component and a microporous membrane comprising a polyethylene as a major component are laminated.

[47]

The separator according to [46], wherein a density of the polyethylene for the microporous membrane comprising the polyethylene as a major component is 0.96 g/cm$^3$ or more, and a Melt Flow Rate (MFR) of the microporous membrane comprising the polyethylene as a major component is 0.6 g/10 minutes or less.

[48]

The separator according to [46] or [47], wherein the separator comprises not only the microporous membrane comprising a polypropylene as a major component, but also the microporous multi-layered membrane.

[49]

A method of producing the separator according to any one of [38] to [48], comprising the steps of:
forming a raw film comprising the polypropylene by means of a circular die extrusion method; and
annealing the raw film before heating and stretching the raw film.

Advantageous Effects of Invention

According to the first embodiment of the present invention, it is possible to provide a dry stretching resin microporous membrane and a separator for an electric storage device being excellent in balance between the required performances such as product safety, charge/discharge characteristic, dimension stability, energy cost, consideration to the environment, etc.

According to the second embodiment of the present invention, it is possible to provide a microporous membrane and a separator for an electric storage device having excellent product safety.

According to the third embodiment of the present invention, it is possible to provide a dry-stretched microporous membrane and a separator for an electric storage device being excellent in product safety, even though they are made into the form of a thin membrane.

DESCRIPTION OF EMBODIMENTS

Figure 1:
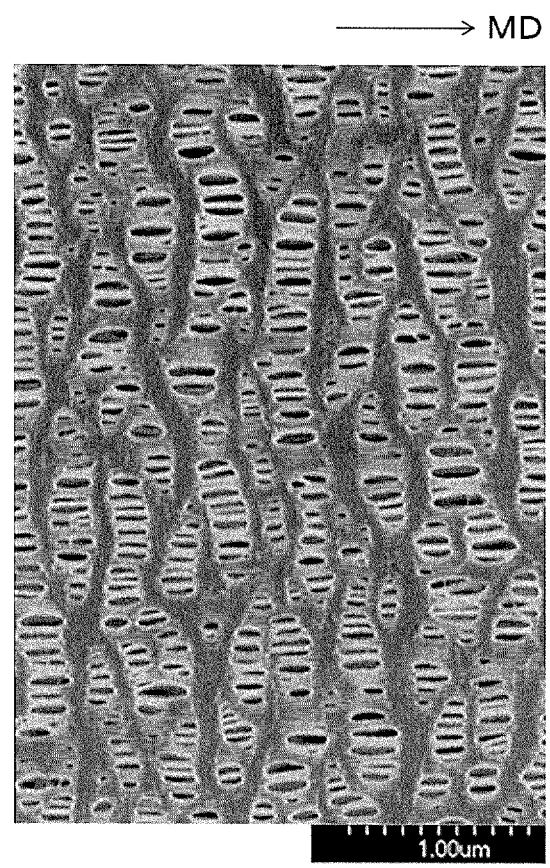
FIG. 1 is a SEM photograph of a surface of a microporous membrane comprising fibrils and a matrix structure of the present invention during uniaxial stretching.

Embodiments for carrying out the invention (hereunder referred to as "embodiments") will now be explained in detail. It is to be understood, however, that the invention is not limited to these embodiments, and may incorporate various modifications within the scope of the gist thereof.

Definition

In the present specification, the abbreviation "MD" means the machine direction of continuous microporous membrane processing, and the abbreviation "TD" means the direction crossing the MD at an angle of 90°.

The microporous membrane is a single layer membrane consisting of a single polyolefin-based microporous layer, a microporous single layer membrane consisting of a resin layer other than the polyolefin-based microporous layer, or a composite microporous single layer membrane comprising a polyolefin-based resin and a resin other than thereof, and is hereunder referred to as "microporous layer" in some cases.

A polyolefin-based microporous membrane is formed from a polyolefin resin composition containing a polyolefin resin as a major component.

A polypropylene-based microporous membrane is formed from a polypropylene resin composition containing polypropylene as a major component.

In the present specification, a membrane containing the specific material as a main component means that the membrane contains 50% or more material by weight with respect to the weight of the membrane.

In the present specification, a microporous membrane containing a polyolefin resin as a main component means that the proportion of the polyolefin resin in the microporous membrane is equal to or greater than 50 weights % with respect to the weight of the microporous membrane, indicating that the polyolefin resin is capable of forming a polymer network in the microporous membrane.

A polypropylene resin composition containing polypropylene as a main component means that the proportion of the polypropylene in the polypropylene resin composition is equal to or greater than 50 weights % with respect to the weight of the polypropylene resin composition.

A microporous multi-layered membrane is a multi-layered membrane in which a plurality of polyolefin-based microporous layers are laminated or a composite microporous membrane in which a polyolefin-based microporous membrane and a microporous membrane containing a different resin are laminated, and is hereunder simply referred to as a multi-layered body in some cases.

A separator for an electric storage device (hereunder referred to as "separator" in some cases) is a member disposed between a plurality of electrodes in an electric storage device and being ion permeable, and depending on the need it may also have a shutdown property. The separator comprises the microporous membrane and/or the microporous multi-layered membrane, and may be provided with an arbitrary functional layer as desired.

In the present specification, "air permeability resistance" or "air permeability of a separator" is a value (hereunder referred to as "air permeability resistance calibrated to a (separator) thickness of 14 µm" in some cases) obtained by multiplying an actual measured air permeability resistance of the separator by 14 µm after dividing the actual measured air permeability resistance by a thickness of the separator.

In the present specification, "puncture strength" or "puncture strength of a separator" is a value (hereunder referred to as "puncture strength calibrated to a (separator) thickness of 14 µm" in some cases) obtained by multiplying an actual measured puncture strength of the separator by 14 µm after dividing the actual measured puncture strength by a thickness of the separator.

First Embodiment

<Separator for Electric Storage Device Comprising High Strength Polypropylene-Based Microporous Membrane>

The first embodiment of the present invention is a separator for an electric storage device comprising a polypropylene-based microporous membrane having a high strength.

The microporous membrane has the following regions:
(i) a polymeric matrix comprising a polypropylene resin (A) and a thermoplastic elastomer (B);
(ii) fibrils comprising the polypropylene resin (A) and extending in a Machine Direction (MD) of the microporous membrane from the polymeric matrix; and
(iii) pores between a plurality of the fibrils.

The fibril means a minimum unit of network structure containing the polypropylene resin (A). At least one pore is fixed by the fibril. This fibril is formed by stretching a polymer chain of the polypropylene at the time of pore opening upon stretching of the polymer. In a region other than fibrils (hereinafter referred to as "polymeric matrix"), in the case of uniaxial stretching, lamellar crystals are arranged, causing strengthening to MD, and the shrinkage ratio of TD can be maintained low. FIG. 1 is a SEM photograph of the surface of the microporous membrane upon uniaxial stretching, and the fibrils and the polymeric matrix are confirmed from FIG. 1.

Upon biaxial stretching, the polymeric matrix improves the strength of TD by reducing orientation of the lamellar crystals, and the strength ratio balance between MD and TD becomes good.

The microporous membrane according to the first aspect has the aforementioned (i) to (iii) and a Melt Flow Rate (hereinafter abbreviated as MFR) of the microporous membrane is 1.5 g/10 minutes or less. The microporous membrane according to the first aspect can be obtained by melt kneading a high molecular weight polypropylene and a thermoplastic elastomer in an extruder, however, during that time, molecular fluctuation by deterioration of the polymer including degradation, i.e., increase in MFR is likely to be induced. Therefore, from the viewpoint of controlling the microporous membrane by MFR value of a resin composition forming the microporous membrane itself, the constitution of the microporous membrane enabling to ensure numerous physical properties such as product safety, charge/discharge characteristic, dimension stability, energy cost, consideration to the environment, etc., is specified by the MFR value of 1.5 g/10 minutes or less of the microporous membrane.

When MFR of a microporous membrane becomes 1.5 g/10 minutes or less, in particular, sufficient melt tension when forming a thin membrane can be obtained and reduction in quality or dignity is likely to be suppressed. Furthermore, when the MFR of a microporous membrane becomes 1.5 g/10 minutes or less, deterioration of the polymer is less likely to occur, from which uniformity improves, thickness non-uniformity as well as composition unevenness is less likely to be generated, and reduction in product quality and dignity is likely to be suppressed.

The microporous membrane according to the second aspect has the aforementioned (i) to (iii) and MFR of the polypropylene resin (A) is 1.0 g/10 minutes or less.

The molecular weight of polypropylene can be determined according to the MFR. It is not our intention to be limited by theory, however, the MFR (230° C., 2.16 kg load) of polypropylene in the polypropylene resin (A) used specifies the structure of (i) polymeric matrix and (ii) fibrils, being important from the viewpoint of balance among strength, porosity, air permeability resistance and dimensional stability of the microporous membrane formed by a dry pore-forming method. From such viewpoint, as an index of forming the microporous membrane by selecting the polypropylene resin (A), the MFR of 1.0 g/10 minutes or less of polypropylene resin (A) was found to be suitable.

The polypropylene satisfying the MFR of 1.0 g/10 minutes or less can be obtained by melting or solution-blending polypropylenes having a plurality of molecular weights.

When a polypropylene resin having MFR of greater than 1.0 g/10 minutes is used, the strength of a microporous membrane cannot be sufficiently exhibited, and it is difficult to obtain a separator for an electric storage device having the targeted characteristics.

The microporous membrane according to the third aspect has the aforementioned (i) to (iii) and a region in which a ratio (MD/TD) of a length in a Machine Direction (MD) to a length in a Transverse Direction (TD) is 1.5 or more in the region of the thermoplastic elastomer (B).

As for a dispersing form of the thermoplastic elastomer into polypropylene, i.e., as a morphology, the microporous membrane has, in the region of the thermoplastic elastomer, a region in which a ratio (MD/TD) of a length in MD to a length in TD is 1.5 or more. The ratio (MD/TD) of a length is preferably 2.5 or more, and more preferably 4.0 or more.

When the ratio (MD/TD) of a length is 1.5 or more, high strength and/or reduction in heat shrinkage ratio is likely to be exhibited.

The upper limit of the ratio (MD/TD) of a length is not particularly restricted, and may be 12.0 or less, 10.0 or less, 8.0 or less, or 6.0 or less.

Figure 2:
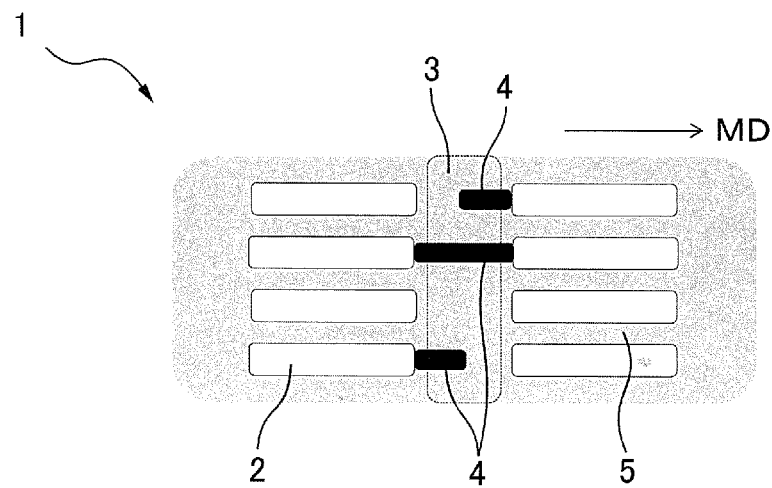
FIG. 2 is a schematic diagram illustrating a state in which the thermoplastic elastomer region referred to in the present specification is oriented in parallel to the Machine Direction (MD) of the microporous membrane.

As a dispersing form of the thermoplastic elastomer into polypropylene, i.e., as a morphology, the region of the thermoplastic elastomer in the microporous membrane is preferably oriented parallel to the MD of the microporous membrane. FIG. 2 shows a schematic diagram for a state that a plurality of the thermoplastic elastomers (4) is oriented in parallel to the MD of the microporous membrane (1). There exists the pore (2) between a plurality of fibrils (5, 5), and the region of the microporous membrane (1) excluding fibril (5) is the polymeric matrix (3). From one side or both sides of the several polymeric matrices, the fibril (5) extends along with the MD of microporous membrane (1).

From the viewpoint of balance between strength, porosity, air permeability resistance and dimension stability of a microporous membrane formed by a dry pore-forming method, the fibril (5) more preferably extends between a plurality of polymer matrices (3, 3), and/or the pores are present between the adjacent plurality of fibrils (5, 5).

The microporous membrane according to the fourth aspect has the aforementioned (i) to (iii) and satisfies at least two conditions of the following conditions of (1) to (4):

(1) a Melt Flow Rate (MFR) of the microporous membrane is 1.5 g/10 minutes or less;
(2) MFR of the polypropylene resin (A) is 1.0 g/10 minutes or less;
(3) the thermoplastic elastomer (B) forms a region in which a ratio (MD/TD) of a length in a Machine Direction (MD) to a length in a Transverse Direction (TD) is 1.5 or more; and
(4) a region of the thermoplastic elastomer in the microporous membrane is oriented in parallel to the MD of the microporous membrane.

In the following, constitution elements, production methods, etc., of the microporous membrane according to the first, second, third, and fourth aspects will be explained.

It is preferable to render the thermoplastic elastomer not present in the fibrils but selectively present in the polymeric matrix. This is because rendering the thermoplastic elastomer present together in the fibril cannot contribute to higher strengthening and reduction in a heat shrinkage ratio. A method of rendering the thermoplastic elastomer present in the matrix includes, for example, a method of cold stretching a film in which a lamella crystalline is stretched and oriented, followed by hot stretching to pore opening between the lamella crystals.

In the first embodiment, examples of polypropylene include isotactic and syndiotactic highly crystallized homopolymers, copolymers or block copolymers obtained by copolymerizing small amounts of α-olefin comonomers, and one or, two or more of them can be used in admixture. The polymerization catalyst is also not particularly limited, and examples thereof include a Ziegler-Natta type catalyst, a metallocene type catalyst, etc.

The molecular of polypropylene is determined according to MFR, and the MFR (230° C., 2.16 kg load) of the polypropylene used, from the viewpoint of balance among the strength, porosity, air permeability resistance and dimensional stability of the microporous film formed by a dry pore-formation method, is preferably less than 1.0 g/10 minutes, more preferably 0.9 g/10 minutes or less, and further preferably 0.8 g/10 minutes or less. The lower limit of MFR is not particularly limited, and the MFR (230° C., 2.16 kg load) of polypropylene may be 0.1 g/10 minutes or more, 0.15 g/10 minutes or more, or 0.2 g/10 minutes or more.

Specific examples of the thermoplastic elastomer include an ethylene/α-olefin copolymer, ethylene/styrene copolymer, propylene/α-olefin copolymer, 1-butene/α-olefin copolymer, block copolymer (SBS) of styrene and butadiene and hydrogenated polymer thereof (SEBS), block copolymer of styrene and isoprene (SIS) and hydrogenated polymer thereof (SEPS), etc. Examples of an α-olefin include aliphatic-type α-olefins such as propylene, 1-butene, 1-hexene, 1-octene, 4-methyl-1-pentene, etc. A high molecular weight material obtained by copolymerizing ethylene and α-olefin, and a high molecular weight material such as a linear low-density polyethylene or ultra-low-density polyethylene which is obtained by copolymerizing a branched long chain via a chain transfer reaction during the polymerization, are also included. Such thermoplastic elastomer (B) may be used alone or in combination of two or more in admixture. Among them, the preferable elastomer is a thermoplastic elastomer free of propylene. The thermoplastic elastomer free of propylene has low interaction with polypropylene, forming a completely independent domain, and generating an effect of improving flowability thereby. In particular, when an extremely high molecular weight of polypropylene is utilized in the first, second, third or fourth aspect, the melting viscosity thereof significantly affects the quality such as thickness, etc., thus it is of importance to reduce the melting viscosity as low as possible. When a thermoplastic elastomer containing propylene is utilized, since an effect of reducing the melting viscosity is small, unevenness of thickness is likely to become greater. A more preferable thermoplastic elastomer is a polymer having at least one component selected from the group consisting of an ethylene/1-butene copolymer, ethylene/1-hexene copolymer, and ethylene/1-octene copolymer. These polymers may be random copolymers or block copolymers, or may be a blocked polymer with polystyrene and an ethylene/1-butene copolymer component (for example, SEBS), etc. Each component of the ethylene/1-butene copolymer, ethylene/l-hexene copolymer, and ethylene/1-octene copolymer has an advantage of high interfacial adhesiveness with polypropylene, allowing the polymer to be micro-dispersed. Namely, these copolymer components are high molecular weight components likely to be oriented in parallel to the MD direction of the microporous membrane.

In the case of a crystalline thermoplastic elastomer in which a hard segment of a thermoplastic polymer is a crystalline polymer, a crystalline melting point peak thereof is preferably 50° C. or higher and up to 110° C., more preferably 60° C. or higher and up to 105° C., and further preferably 65° C. or higher and up to 100° C. When the melting point peak is 50° C. or higher, adhesion between films is less likely to occur, and it is preferable when a microporous membrane is taken out from a wound roll of the microporous membrane. When the melting point peak is 110° C. or lower, a desirable porosity can be realized in a step of pore opening upon stretching of the microporous membrane.

In the case of a non-crystalline thermoplastic elastomer, namely in the case of a non-crystalline polymer in which a hard segment of a thermoplastic polymer is a non-crystalline polymer, the glass transition temperature thereof is preferably 30° C. or higher and up to 110° C., more preferably 40° C. or higher and up to 105° C., and further preferably 50° C. or higher and up to 100° C. When the glass transition temperature is 30° C. or higher, adhesion between films is less likely to occur, and it is preferable when a microporous membrane is taken out from a wound roll of the microporous membrane. When the glass transition temperature is 110° C. or lower, desired porosity can be realized in a step of pore opening upon stretching of the microporous membrane.

MFR of the thermoplastic elastomer is preferably 2.0 g/10 minutes or more, more preferably 2.5 g/10 minutes or more, and further preferably 3.0 g/10 minutes or more, and even further preferably 4.0 g/10 minutes or more. The upper limit of MFR of the thermoplastic elastomer is not particularly restricted, and may be 15.0 g/10 minutes or less, 12.0 g/10 minutes or less, 10.0 g/10 minutes or less, or 9.0 g/10 minutes or less.

When MFR is 2.0 g/10 minutes or more, the melting viscosity reduces and the advantages such as improvement in processability of film formation, increase in dispersibility, and uniformity of the membrane thickness are likely to be obtained. The upper limit of MFR of the thermoplastic elastomer is not particularly restricted, and the optimum value is preferably obtained from processability, adhesion, and mechanical properties.

A major component in the microporous membrane is preferably a polypropylene resin (A). The content of the polypropylene resin (A) in the microporous membrane is preferably 50 weights % or more, 60 weights % or more, 70 weights % or more, 80 weights % or more, or 90 weights % or more. The upper limit of the polypropylene (A) in the microporous membrane is not particularly restricted, and may be 100 weights % or less, 99 weights % or less, 98 weights % or less, or 95 weights % or less.

A weight ratio, (A)/(B) of the polypropylene resin (A) to the thermoplastic elastomer (B) is preferably (A)/(B)=99.9/0.1 to 80/20 (weight %), more preferably (A)/(B)=99/1 to 82/18 (weight %), and even more preferably (A)/(B)=98/2 to 86/14 (weight %). When the content ratio of the thermoplastic elastomer is 0.1 weight % or more, the target for high strength and low shrinkage can be realized. In addition, when the content ratio of the thermoplastic elastomer is 20 weight % or less, pore opening capability improves, not only it is of ease to increase a porosity, but also air permeability resistance reduces, and the balance between the air permeability resistance and strength improves.

An accumulated content of the polypropylene resin (A) and the thermoplastic elastomer (B) contained in the microporous membrane is, preferably 50 weights % or more, 60 weights % or more, 70 weights % or more, 75 weights % or more, 80 weights % or more, 85 weights % or more, 90 weights % or more, 95 weights % or more, 98 weights % or more, or 99 weights % or more with respect to the weight (100 weights %) of the microporous membrane. The upper limit of the accumulated content of the polypropylene (A) and the thermoplastic elastomer (B) contained in the microporous membrane is not particularly restricted, and may be 100 weights %, 99.9 weights % or less, 99.5 weights % or less, 99 weights % or less, 98 weights % or less, or 95 weights % or less.

A porosity of the microporous membrane is preferably 30% to 80%, more preferably 33% to 77%, and further preferably 37% to 73%. When the porosity is less than 30%, it is difficult to ensure sufficient ion permeability when the microporous membrane is used for batteries. Furthermore, when the porosity is greater than 80%, the strength of the microporous membrane cannot be maintained. The porosity can be adjusted by controlling a resin composition, mixing ratio between the resin and a plasticizer, oriented crystallization condition, condition of pore opening upon stretching, heat fixation condition, etc.

In order to ensure various physical properties commensurate for the purpose of the microporous membrane, from the viewpoint of controlling the microporous membrane by the MFR value, itself of a resin composition forming the microporous membrane, the MFR value of the microporous membrane is preferably less than 1.5 g/10 minutes, more preferably 1.4 g/10 minutes or less, and further preferably 1.3 g/10 minutes or less. The lower limit of MFR of the microporous membrane is not particularly restricted, and may be 0.05/10 minutes or more, 0.1 g/10 minutes or more, 0.15 g/10 minutes or more, or 0.2 g/10 minutes or more.

An air permeability resistance of a separator comprising a microporous membrane, which is calibrated to a separator thickness of 14 μm, is preferably 100 to 500 seconds/100 ml, more preferably 120 to 450 seconds/100 ml, further preferably 150 to 400 seconds/100 ml, and even more preferably 300 seconds/100 ml or less. When the air permeability is adjusted to 100 seconds or greater, it is preferable from the viewpoint of obtaining a separator comprising a uniform microporous membrane without defects. Furthermore, the air permeability resistance being adjusted to 500 seconds or less can contribute to ensuring sufficient ion permeability.

The puncture strength of a separator comprising a microporous membrane, which is calibrated to a separator thickness of to 14 m, is preferably 400 gf or greater, more preferably 430 gf or greater, and further preferably 450 gf or greater. When the puncture strength is 400 gf or greater, a setting speed of incorporating a thin membrane separator to a battery is enhanced, which is preferable. The upper limit of the puncture strength is not particularly restricted and may be 700 gf or less, 650 gf or less, 600 gf or less, or 550 gf or less.

A microporous membrane can be manufactured in film form by using a co-extrusion equipment. Namely, two or more layers of resin compositions having identical components are laminated to manufacture a raw film followed by pore opening upon stretching of the two or more multi-layered membranes to obtain a microporous membrane. It is easier to obtain the microporous membrane having high strength, by preparing a raw film which is laminated using two or more layers followed by pore opening upon stretching of the raw film to manufacture a microporous membrane, rather than by manufacturing a single layer film having identical resin compositions.

The microporous membrane can be laminated using a microporous membrane comprising polyethylene as a major component and in more detail, the microporous membrane layer (a) of the aforementioned polypropylene resin composition and the microporous membrane layer (b) of polyethylene as a major component can be laminated to form a microporous multi-layered membrane (multi-layered body).

Examples of the constitution of the aforementioned multi-layered body include the following constitutions:
(I) polypropylene layer (a)/polyethylene layer (b)
(II) polypropylene layer (a)/polyethylene layer (b)/polypropylene layer (a)
(III) polyethylene layer (b)/polypropylene layer (a)/polyethylene layer (b)
(IV) polyethylene layer (b)/polyethylene layer (b)/polypropylene layer (a)
(V) polypropylene layer (a)/polyethylene layer (b)/polyethylene layer (b)/polypropylene layer (a).

Among them, the constitution of alternately laminating the polypropylene layer (a) and the polyethylene layer (b) is preferred, and from the productivity point of view, the structure having two types and three layers, in which the two of the surface layers are identical and the middle layer is different, is preferable. The above constitution (II) is particularly preferable.

A method of manufacturing the aforementioned multi-layered body includes, for example, a method for closely contacting each layer by co-extrusion method or a laminate method of extrusion molding each layer separately followed by laminating each layer. As the laminate method both of a dry laminate method using adhesives, etc., and a melt laminate method of adhering several layers together in molten state can be adopted.

A content of polyethylene containing the polyethylene as a major component in the microporous membrane is preferably 50 weights % or more, 60 weights % or more, 70 weights % or more, 80 weights % or more, 90 weights % or more, or 95 weights % or more.

A density of polyethylene containing the polyethylene as a major component in the microporous membrane is preferably 0.96 g/cm$^3$ or more. The upper limit is also not particularly restricted, and may be 0.98 g/cm$^3$ or less or 0.97 g/cm$^3$ or less.

Additionally, MFR of the microporous membrane containing polyethylene as a major component is preferably 0.6 g/10 minutes or less. The lower limit of the MFR of the microporous membrane containing polyethylene is not particularly restricted, and may be 0.05 g/10 minutes or more, 0.1 g/10 minutes or more, or 0.15 g/10 minutes or more.

Second Embodiment

<Separator for Electric Storage Device>

The second embodiment of the present invention is a separator for an electric storage having a microporous membrane.

<Microporous Membrane Comprised in Separator>

The microporous membrane according to the first aspect comprises a polyolefin resin as a major component. A puncture depth (hereinafter referred to as "maximum-stress puncture depth") at which the maximum puncture strength is exhibited during the puncture test of a separator comprising the microporous membrane according to the first aspect, is 4.0 mm or greater.

As used herein, "puncture depth" is the moving distance (depth) of a specific-size needle from the moment after it contacts the separator until it opens a hole, assuming that the peripheral edges of the separator are anchored and the needle is used to pierce the separator in the thickness direction from the outer surface of the separator. The puncture test for measuring the puncture depth and puncture strength are explained in the Examples.

Herein, constitution of a separator excellent in product safety is specified by a puncture depth of 4.0 mm or greater of the separator. The puncture strength of the separator will also tend to improve if the maximum-stress puncture depth of the separator is 4.0 mm or greater. According to such point of view, the maximum-stress puncture depth of 4.0 mm or greater has been found to be useful as an index for selection of a polyolefin resin that can be used to form a microporous polyolefin membrane. Here, the maximum-stress puncture depth is the puncture depth at which the maximum puncture strength is exhibited. For the purpose of further improving safety of a separator or an electric storage device, the maximum-stress puncture depth of the separator is preferably 5.0 to 20 mm, and more preferably 6.0 to 18 mm. The maximum-stress puncture depth can be adjusted by controlling a compounding condition of the resin composition constituting the microporous membrane, extrusion condition, oriented crystallization condition, condition of pore opening upon stretching, heat setting condition, etc. From the same viewpoint, the maximum puncture strength in the puncture test of the separator is preferably 20 gf/μm or greater and more preferably 25 to 50 gf/μm.

From the viewpoint of safety of an electric storage device including a microporous membrane as a separator, particularly a laminate type lithium-ion secondary battery, the puncture strength has preferably two or more maximum values in the depth-strength curve during the puncture test of the separator, and the maximum puncture strength is more preferably at least one among the two or more maximum values. A number of the maximum of the puncture strength is not particularly restricted, and may be three or more, four or more, or five or less, four or less, or three or less.

Without wishing to be bound by any theory, it is conjectured that when the puncture strength has two or more maximum values in the depth-strength curve, distortion of the membrane is improved by microscopic breakage generated in the membrane from the start to the end of the puncture test, and then complete rupture occurs afterwards. It is inferred that the strength of the microporous membrane is also enhanced when there observed a phenomenon of improvement in the distortion of the microporous membrane before the complete rupture.

From the viewpoint of improving the distortion of the membrane, it is further preferable to have a profile (not shown in a figure) in which the subsequent maximum value observed after the first maximum value among the two or more maximum values is the maximum puncture strength in the depth-intensity curve.

Figure 4:
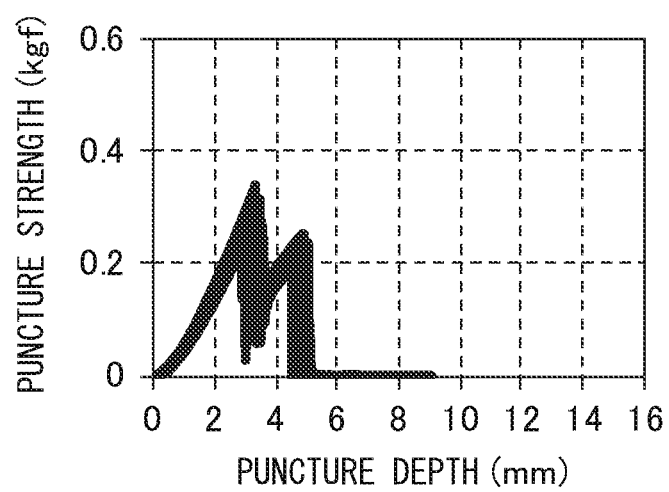
FIG. 4 is an example of a profile of a depth-intensity curve in which the puncture strength has two or more maximum values.

FIG. 4 shows an example of a profile of the depth-intensity curve in which the maximum value observed first is the maximum puncture strength among the two or more puncture maximums of the puncture strength.

In order to secure various physical properties of the microporous membrane, it is preferable to control the microporous membrane with a Melt Flow Rate (MFR) value of the microporous membrane itself. From such a viewpoint, the MFR value of the microporous membrane according to the first aspect is preferably 1.4 g/10 minutes or less, more preferably 1.3 g/10 minutes or less. The lower limit of the MFR of the microporous membrane is not particularly restricted, and may be 0.1 g/10 minutes or more, 0.2 g/10 minutes or more, or 0.3 g/10 minutes or more. The method of measuring the MFR is measured in Example.

The microporous membrane according to the second aspect comprises, (A) a polyolefin resin as a main component; and
(B) at least one selected from the group consisting of an ethylene/α-olefin copolymer different from the polyolefin resin, a propylene/α-olefin copolymer different from the polyolefin resin, a styrene/olefin copolymer different from the polyolefin resin, and the polyolefin resin, and a polypropylene elastomer different from the polyolefin resin;

and has an average longest pore diameter of the microporous membrane between 100 nm or more and 2000 nm or less, and a Melt Flow Rate (MFR) of the microporous membrane of 1.4 g/10 minutes or less.

Although not wishing to be bound by theory, it is conjectured that an excellent air permeability resistance, high puncture strength, and high safety are achieved by adjusting the average longest pore diameter of the microporous membrane containing the components (A) and (B) to be within the range of 100 nm to 2000 nm and adjusting the MFR to 1.4 g/10 minutes or less, and therefore the constitution of the separator excellent in product safety can be specified by adjusting the compositions, (A) and (B), the average longest pore diameter and the MFR of the microporous membrane. In order to further improve the safety of the separator and an electric storage device, the average longest pore diameter of the microporous membrane according to the second aspect is preferably 60 to 1000 nm or less and more preferably 100 to 700 nm or less, and the MFR value is preferably 1.3 g/10 minutes or less, more preferably 1.1 g/10 minutes or less, and particularly preferably 0.9 g/10 minutes or less. The method of measuring the average longest pore diameter is described in the Example. In addition, in order to further improve the safety of the separator and the electric storage device, the pore diameter ratio (a)/(b) of the longest pore diameter (a) to a pore diameter (b) perpendicular to the longest pore diameter (a) is preferably 1.5 or more and 30 or less, and more preferably 3 or more and 20 or less. Furthermore, the longest pore diameters of the microporous membrane are preferably arranged in one direction, and it is more preferable that the direction is the MD (direction). By achieving such a pore diameter, it becomes possible to realize a high puncture strength while securing a good air permeability resistance and to reduce an unsafe mode such as dendrite formation in the electric storage device.

The constituent components, physical properties, morphology, production method, etc., of the microporous membrane according to the first and second aspects will be described below.

The proportion of the polyolefin resin in the microporous membrane is preferably from 50 weight % to 100 weight %, more preferably from 55 weight % to 99 weight %, and particularly preferably from 60 weight % to 98 weight %, from the viewpoint of wettability, thickness and shutdown characteristics of the membrane.

As the polyolefin resin, for example, homopolymers, copolymers or multistage polymerized polymers obtained using ethylene, propylene, 1-butene, 4-methyl-1-pentene, 1-hexene, 1-octene, etc., are included. These polyolefin resins may be used alone or in combined use of two or more. Among them, polyethylene, polypropylene, copolymers thereof, and mixtures thereof are preferable from the viewpoint of shutdown characteristics, and one or more polypropylenes are more preferable from the viewpoints of shutdown characteristics, octane insolubility and hexane insolubility.

Specific examples of the polyethylene resin include low density polyethylene, linear low-density polyethylene, medium density polyethylene, high-density polyethylene, ultra-high molecular weight polyethylene, etc. In the present specification, the high-density polyethylene refers to polyethylene having a density of 0.942 to 0.970 g/cm$^3$. The density of polyethylene is a value measured according to D) density gradient tube method described in JIS K 7112 (1999).

In the second embodiment, the polypropylene resin referred to in the first embodiment may be used.

The molecular weight of the polypropylene resin can be determined according to the MFR. From the viewpoint of balance between the strength, porosity, air permeability resistance and dimensional stability of the microporous film formed by a dry pore-forming method, the MFR (230° C., 2.16 kg load) of the polypropylene resin to be used is preferably 1.1 g/10 minutes or less, more preferably 0.9 g/10 minutes or less, and further preferably 0.6 g/10 minutes or less.

From the viewpoint of safety of the separator, i.e., safety of balance among the strength and porosity as well as air permeability resistance and dimensional stability of the separator, a polyolefin resin composition preferably contains, in addition to the polyolefin resin as a major component, a thermoplastic elastomer, copolymer having a branched chain, copolymer having a conjugated double bond, copolymer having a crystalline region and an amorphous region in the molecule, etc., (hereinafter referred to as "accessory component"). The accessory component can improve the maximum puncture strength and the maximum-stress puncture depth of the microporous membrane and is different from the polyolefin resin which is the main component for forming a polymer network.

The polyolefin resin composition may include as the accessory component, for example, a polypropylene elastomer, ethylene/α-olefin copolymer, propylene/α-olefin copolymer, styrene olefin copolymer, etc. Among them, from the viewpoint of increasing the maximum-stress puncture depth, the polypropylene elastomer, ethylene/α-olefin copolymer, propylene/α-olefin copolymer are more preferable, the ethylene/α-olefin copolymer is further preferable, and the ethylene/1-butene copolymer (hereinafter also referred to as "C2/C4 copolymer") is particularly preferable.

When the microporous membrane comprises the polyolefin resin (A) as a main component and the accessory component (B), the weight ratio (A)/(B) of the polyolefin resin (A) to the accessory component (B) is (A)/(B)=99/1 to 80/20 (weight %), more preferably (A)/(B)=98/2 to 82/18 (weight %), and further preferably (A)/(B)=97/3 to 85/15 (weight %), from the viewpoint of strengthening, reduction of shrinkage ratio, and pore opening capability of the microporous membrane As a preferable morphology of the microporous membrane, it comprises the following (i) to (iii):
(i) a polymeric matrix containing a polyolefin resin,
(ii) fibrils extending from the polymeric matrix in a Machine Direction (MD) of the microporous membrane and comprising a polyolefin resin,
(iii) pores present between a plurality of fibrils.

The average longest pore diameter of the microporous membrane having the above (i) to (iii) tends to be in the range of 100 nm or more and 2000 nm or less.

The preferable morphology in the second embodiment is the aforementioned morphology explained in the first embodiment in which FIG. 1 and FIG. 2 are referred to.

The thermoplastic elastomer is preferably not present in the fibril but selectively present in the polymeric matrix, according to the aforementioned reasons and methods explained in the first embodiment.

The dispersing form of the thermoplastic elastomer in a polyolefin resin, i.e., a morphology, is also the same as the morphology of the first embodiment.

From the viewpoint of product safety, the porosity of the microporous membrane is preferably 30 to 80%, more preferably 31 to 70%, further preferably 33 to 67%, and even more preferably 37 to 63%. The porosity can be adjusted by controlling a resin composition, mixing ratio of a resin and plasticizer, oriented crystallization condition, condition of pore opening upon stretching, heat fixing condition, etc.

An air permeability resistance when a thickness of a separator comprising the microporous membrane is calibrated to 14 μm, is preferably 100 to 700 seconds/100 ml, more preferably 120 to 600 seconds/100 ml, further preferably 150 to 500 seconds/100 ml, and even more preferably 400 seconds/100 ml or less. It is preferable to set the air permeability resistance to 100 seconds or more from the viewpoint of obtaining a separator comprising a homogeneous microporous membrane without defects. Also, setting the air permeability resistance to 700 seconds or less can contribute to securing sufficient ion permeability.

Third Embodiment

<Separator for Electric Storage Device Comprising Polypropylene-Based Microporous Membrane>

The third embodiment of the present invention is a separator for an electric storage device comprising a polypropylene-based microporous membrane.

The microporous membrane has the following regions:
(i) a polymeric matrix comprising polypropylene;
(ii) fibrils comprising the polypropylene and extending in a Machine Direction (MD) of the microporous membrane from the polymeric matrix; and
(iii) pores between a plurality of the fibrils.

The morphology expressed by the constituent elements of (i) to (iii) is the aforementioned morphology explained in the first embodiment in which FIGS. 1 and 2 are referred to.

The microporous membrane according to the third embodiment has a porosity of 30 to 80% and a puncture strength of equal to or greater than 400 gf when calibrated to a thickness of a separator comprising the microporous membrane of 14 μm.

The porosity means a proportion of air per unit volume of a membrane. In general, when the porosity of a microporous membrane is high, in the case of using the microporous membrane in a nonaqueous electrolytic solution-type battery, holdability or liquid absorbability of the electrolytic solution improves, and a cycle characteristic of the battery is improved. Thus it is conjectured that the porosity, in the case of using the microporous membrane as a separator for an electric storage device, is associated with designing for battery reliability.

Puncture strength represents a stress of the membrane when the membrane is punctured and passed through with a needle. The puncture strength is conjectured to associate with a strength of a separator containing the microporous membrane for an electric storage device.

The present inventors have found that in a specific porosity region of the microporous membrane, a rapture pattern obtained in the puncture test can be varied by producing a separator in which a puncture strength is controlled to be greater than the specific strength with respect to the specific thickness of a separator comprising the microporous membrane. Namely, in the porosity region of from 30 to 80% of the microporous membrane, it has become possible to have the rupture pattern of the membrane constituting the separator varied in two steps by controlling the puncture strength to be 400 gf or more when calibrated to the separator thickness of 14 μm. The two-step rupture pattern obtained in the third embodiment means that as shown in FIG. 4, in the depth-strength curve of the puncture test, there observed two inflection points at which strength is decreased, a small cleavage is formed at the first inflection point, and the needle used for the puncture test passes through the membrane at the second inflection point. In the third embodiment, the puncture strength of equal to or greater than 400 gf obtained when calibrating the thickness of the separator to 14 μm means the strength value at the second inflection point. The constitution of the separator allowing product safety to improve, compared to that by the conventional method, is specified by both the porosity of the microporous membrane and the puncture strength of the separator calibrated to the separator thickness of 14 μm.

A porosity of the microporous membrane is preferably, from the aforementioned point of view, between 30% to less than 80%, more preferably 33% to 75%, and further preferably 37% to 70%. The porosity can be adjusted by controlling a resin composition, mixing ratio between the resin and a plasticizer, oriented crystallization condition, condition of pore opening upon stretching of the microporous membrane, heat fixation condition, etc.

A puncture strength of a separator calibrated to a separator thickness of 14 μm is preferably, from the aforementioned point of view, is greater than 400 gf, more preferably 420 gf or grater, and further preferably 440 gf or greater. The upper limit of the puncture strength is not particularly restricted, and may be 700 gf or less, 650 gf or less, 600 gf or less, or 550 gf or less. When the puncture strength is 400 gf or more, the prescribed rupture pattern is always observed, being preferable from the point of quality control. The puncture strength can be adjusted by controlling a resin composition, mixing ratio between the resin and a plasticizer or liquid modifier, oriented crystallization condition, condition of pore opening upon stretching, heat fixation condition, etc., and furthermore, from the viewpoint of balance between strength and porosity of the microporous membrane as well as air permeability resistance and dimension stability of the separator, it is preferable to contain, in addition to polypropylene, a thermoplastic elastomer free of propylene.

In the third embodiment, the polypropylene referred to in the first embodiment may be used.

A molecular weight of polypropylene can be determined according to a Melt Flow Rate (hereinafter abbreviated as MFR). The MFR (230° C., 2.16 kg load) of the polypropylene to be used is, from the viewpoint of product safety of the microporous membrane formed by a dry pore-forming method, preferably 1.0 g/10 minutes or less, more preferably 0.8 g/10 minutes or less, and further preferably 0.6 g/10 minutes or less. The lower limit is not particularly restricted, and the MFR (230° C., 2.16 kg load) of polypropylene may be 0.1 g/10 minutes or more, 0.15 g/10 minutes or more, or 0.2 g/10 minutes or more.

When the polypropylene having MFR of 1.0 g/10 minutes or less is used, sufficient strength of the microporous membrane can be exhibited, therefore, it is of ease to obtain a separator for an electric storage device having targeted properties.

A thermoplastic elastomer utilized in the third embodiment is preferably a thermoplastic elastomer free of propylene. The thermoplastic elastomer free of propylene has low interaction with polypropylene, forms completely separated domains, and produces an effect of improving flowability thereby. Particularly, in the case of utilizing polypropylene with an extremely high molecular weight such as that of this embodiment, the high melting viscosity significantly affects quality such as thickness of the polymer, therefore it is of importance to reduce the melting viscosity as low as possible. When a thermoplastic elastomer containing polypropylene is utilized, the effect of reducing the melting viscosity is low, from which a thickness of the polymer tends to significantly vary.

Specific examples of the thermoplastic elastomer preferably include an ethylene/α-olefin copolymer (excluding propylene), ethylene/styrene copolymer, 1-butene/α-olefin (excluding propylene) copolymer, block copolymer (SBS) of styrene and butadiene and hydrogenated polymer thereof (SEBS), block copolymer of styrene and isoprene (SIS) and hydrogenated polymer thereof (SEPS), etc. Examples of the α-olefin include aliphatic-type α-olefins such as 1-butene, 1-hexene, 1-octene and 4-methyl-1-pentene. A high molecular weight material obtained by copolymerizing ethylene and α-olefin, and a high molecular weight material such as a linear low-density polyethylene or ultra low-density polyethylene which is obtained by copolymerizing a branched long chain via a chain transfer reaction during the polymerization, are also included. Such thermoplastic elastomer (B) may be used alone or in combination of two or more in admixture.

A more preferable thermoplastic elastomer is a polymer having any one of an ethylene/1-butene copolymer, ethylene/1-hexene copolymer, and ethylene/1-octene copolymer. These polymers may be random copolymers or block copolymers, and may be a blocked polymer (for example, SEBS) with polystyrene and the ethylene/1-butene copolymer component. Each component of the ethylene/1-butene copolymer, ethylene/1-hexene copolymer, and ethylene/1-octene copolymer has an advantage of high interfacial adhesiveness with polypropylene, allowing the polymer to be microdispersed. Namely, these copolymer components are high molecular weight components likely to be oriented in parallel to the MD direction of the microporous membrane.

In the case of a crystalline thermoplastic elastomer in which a hard segment of a thermoplastic polymer is a crystalline polymer, a preferable crystalline melting point peak thereof is the peak that was explained in the first embodiment.

In the case of a non-crystalline thermoplastic elastomer, namely in the case of a non-crystalline polymer in which a hard segment of a thermoplastic polymer is the non-crystalline polymer, a preferable glass transition temperature thereof is the glass transition temperature explained in the first embodiment.

A preferable MFR of the thermoplastic elastomer is the MFR explained in the first embodiment.

A preferable major component in the microporous membrane according to the third embodiment is the polypropylene resin (A) referred to in the first embodiment, and a preferable content of the polypropylene resin (A) is also the same as that of the first embodiment.

In the third embodiment, a preferable weight ratio (A)/(B) of the polypropylene resin (A) to the thermoplastic elastomer (B) and a preferable accumulated content of the polypropylene resin (A) and the thermoplastic elastomer (B) contained in the microporous membrane are the weight ratio (A)/(B) and the accumulated content, respectively, both of which were referred to in the first embodiment.

As a dispersing form of the thermoplastic elastomer into polypropylene, i.e., as a morphology, the region of the thermoplastic elastomer in the microporous membrane is preferably arranged parallel to the MD stretching direction. The morphology is the aforementioned morphology explained in the first embodiment in which FIGS. 1 and 2 were referred to. High strength and/or reduction in a heat shrinkage ratio are exhibited by forming such the morphology.

It is preferable to render the thermoplastic elastomer not present in the fibrils but selectively present in the matrix, according to the aforementioned reasons and methods explained in the first embodiment.

The microporous membrane can be obtained by melt-kneading a high molecular weight polypropylene and thermoplastic elastomer free of propylene as desired in an extruding machine, however, a molecular weight fluctuation caused by polymer deterioration including degradation, i.e., an increase in MFR is likely to be induced. Accordingly, in order to ensure various kinds of physical properties so as to serve the aim of the microporous membrane, it is preferable to control the microporous membrane using MFR of the microporous membrane itself. From the same point of view, the MFR value of the microporous membrane is preferably 1.5 g/10 minutes or less, more preferably 1.4 g/10 minutes or less, and further preferably 1.3 g/10 minutes or less. The lower limit of the MFR is not particularly restricted, and may be 0.05 g/10 minutes or more, 0.1 g/10 minutes or more, 0.15 g/10 minutes or more, or 0.2 g/10 minutes or more. When the MFR of the microporous membrane is 1.5 g/10 minutes or less, degradation of polypropylene hardly occurs, resulting in suppressing reduction of strength. Furthermore, when the MFR of the microporous membrane is 1.5 g/10 minutes or less, deterioration of the polymer also is suppressed, and not only nonuniformity but also unevenness of thickness, variation of composition ratio, etc., improves, resulting in suppressing reduction in product quality and dignity.

A preferable air permeability resistance of a whole microporous membrane is the resistance referred to in the first embodiment.

The microporous membrane according to this embodiment can be laminated by using a microporous membrane comprising polyethylene as a major component. In this embodiment, the microporous membrane layer (a) of the aforementioned polypropylene resin composition and the microporous membrane layer (b) of polyethylene as a major component can be laminated to form a microporous multi-layered membrane.

Examples of the constitution of the aforementioned microporous multi-layered membrane and the detail of the microporous membrane comprising polyethylene as a major component are the aforementioned examples and detail, respectively explained in the first embodiment.

<Pore Opening Upon Stretching of Microporous Membrane>

The microporous membrane according to the first, second, or third embodiment can be produced into film form by using a coextrusion facility or laminate facility. As one example, two or more layers of resin compositions having identical components are laminated to prepare a raw film followed by pore opening upon stretching of the two or more layers of the multi-layered membrane to manufacture a microporous membrane. As another example, at least one microporous membrane containing a polypropylene resin as a main component and at least one microporous membrane containing a polyethylene resin as a main component are laminated to prepare a raw film, followed by pore opening upon stretching of the two or more layers of the multi-layered membrane to manufacture a microporous membrane. It is easier to obtain a microporous membrane having higher strength by preparing a raw film in which two or more-layer films are laminated followed by pore opening upon stretching of the film to manufacture a microporous membrane, rather than by preparing a raw film using a single layer film followed by the pore opening upon stretching of the film. From this viewpoint, in the case of a multi-layered film in which a plurality of polyolefin-based microporous layers are laminated, three or more polyolefin-based microporous layers are preferably laminated, at least two of a microporous layer (PP microporous layer) containing a polypropylene resin as a major component and at least one microporous layer (PE microporous layer) containing a polyethylene resin as a main component are more preferably laminated, and the three-layer membrane of PP microporous layer/PE microporous layer/PP microporous layer laminated in this order, is further preferable.

As a method for producing a multi-layered membrane in which a plurality of polyolefin-based microporous layers are laminated or a method for producing a composite microporous membrane having a polyolefin-based microporous membrane and another resin microporous membrane, for example, a method in which the respective layers are closely attached with each other by a coextrusion method, a laminate method in which the respective layers are extrusion-molded separately and then closely contacted with each other, etc., can be adopted. As the laminate method, both a dry laminate method using an adhesive, etc., and a heat laminate method of adhering a plurality of layers by applying heat can be adopted.

The microporous membrane is preferably manufactured by a dry stretching method in which the film is directly stretched and oriented after melt-kneaded in an extruder without using a solvent, followed by being subjected to an annealing step, cold stretching step, and hot stretching step in this order. A method for extruding a molten resin via a T die followed by orientation upon stretching of the resin, a circular die extrusion method, etc., can be utilized. Particularly the circular die extrusion method is preferable because the membrane can be made into a thin film form.

The dry stretching method, in particular, a method of orientating a lamella crystalline followed by pore opening caused by interfacial delamination of the crystals, facilitates to align the pore portion, in contrast to a wet method, and the microporous membrane obtained by the method is capable of exhibiting low air permeability resistance with respect to porosity, which is preferable.

Pore opening upon stretching of a film will be described in more detail. A single layer body or multi-layered body of the aforementioned raw films are subjected to stretching treatment. As a stretching condition, uniaxial stretching (MD stretching) can be adopted. A stretching temperature can be adjusted as appropriate according to processing characteristics of a microporous membrane layer (a) of a polypropylene resin or a microporous membrane layer (b) of a polyethylene resin, and further according to an aspect of voids formed in each layer. By such stretching treatment, the voids are provided in each of the microporous membrane layer (a) of polypropylene and polyethylene layer (b). Here, a mechanism (method) of providing the voids includes, for example, a pore opening method at an interface of lamellar crystalline.

The pore opening method at a crystalline interface includes a method of preparing a precursor film by melt-extruding, for example, a crystalline resin such as polyethylene, etc., with a high draw down ratio, annealing the precursor film in a temperature range lower by 5 to 50° C. than the crystalline melting point of the crystalline resin to form an annealed precursor film, and subjecting the annealed precursor film to cold uniaxial stretching in temperature range between −20° C. to 70° C. to a factor of 1.1 to 2 followed by uniaxial stretching in a temperature range lower by 5 to 50° C. than the crystalline melting point of the crystalline resin to a factor of 1.5 to 5 to obtain a microporous membrane (i.e., providing voids in the membrane).

The microporous membrane subjected to uniaxial stretching has an extremely low shrinkage to the TD direction and can be set in the range.

The microporous membrane according to the first, second or third embodiment is preferably used as a separator of an electric storage device.

<Production Method of Microporous Membrane>

A polyolefin resin composition containing a polyolefin resin and a thermoplastic elastomer as desired can be produced by a melt-kneading method using a single-screw or twin-screw extruder. In order to efficiently micro-disperse the thermoplastic elastomer into the polyolefin resin with high molecular weight, a relatively high shear force and a relatively high temperature are required.

It is noted here that the polypropylene resin composition used in the third embodiment preferably comprises a thermoplastic elastomer free of propylene, in addition to polypropylene, from the view point of balance between strength and porosity of the microporous membrane as well as air permeability resistance and dimension stability of the separator.

However, since high shearing force and high temperature are also conditions under which polymer decomposition is likely to occur, sufficient consideration ought to be given to designing a screw of an extruder, or optimizing a screw revolution and temperature setting of each cylinder, and reduction in air contamination. In particular, since air is mixed into the extruder together with the resin pellets, from which the decomposition of the resin composition is accelerated, therefore it is necessary to device measures of melt-kneading the composition under nitrogen purge or nitrogen flow, etc. Furthermore, if necessary, a thermal stabilizer such as a primary and/or secondary antioxidant can be added to the composition.

The obtained resin composition can be used for producing a microporous membrane by a dry method or a wet method.

A dry method includes a method of melt-kneading and extruding a polyolefin resin composition, and then forming a highly oriented film directly from a T die, or a method of forming a highly oriented film by a circular die extrusion method to prepare a raw film, annealing the raw film, micropore opening by cold stretching, and delaminating the polyolefin lamellar crystal interface by hot stretching. According to the circular die extrusion method, for example, a melt-kneaded product of a polypropylene resin composition is blown up from a circular die to MD, and is taken up via a guide plate and a nip roll to obtain a highly crystallized and MD orientated raw film.

A wet method includes a method of melt-kneading a polyolefin resin composition and a pore-forming material to prepare in sheet form followed by stretching if necessary, and extracting the pore-forming material from the sheet, a method of dissolving a polyolefin resin composition followed by immersing it in a poor solvent with respect to polyolefin to solidify while removing the solvent at the same time, etc.

The polyolefin resin composition may contain a resin other than polyolefin, arbitrary additives, etc. Examples of the additives include fluorine-based flow modifying materials, waxes, crystal nucleating materials, antioxidants, metal soaps such as aliphatic carboxylic acid metal salts, ultraviolet absorbers, light stabilizers, antistatic agents, antifogging agents, coloring pigments, etc.

Melt-kneading of the polyolefin resin composition can be carried out by, for example, a kneader, a laboplast mill, a kneading roll, a Banbury mixer, etc., in addition to a single-screw or twin-screw extruder. Further, a direct compound method of directly molding a film after melt-kneading the resin composition in an extruder can also be utilized.

Examples of usable plasticizers include hydrocarbons such as liquid paraffin and paraffin wax; esters such as dioctyl phthalate and dibutyl phthalate; and higher alcohols such as oleyl alcohol and stearyl alcohol.

The pore opening step can be carried out by a known dry method and/or a wet method. A stretching step may also be carried out, either during the pore-forming step or before or after the pore-forming step. Stretching treatment may be carried out by uniaxial stretching or biaxial stretching, however, it is preferable to carry out at least MD stretching. When the membrane is being stretched in one direction, the other direction is in a non-constrained state or in an anchored state with fixed length.

In order to suppress shrinkage of the microporous membrane, heat treatment may be carried out to produce heat setting, either after stretching or after pore formation. The heat treatment may include a stretching operation carried out with the prescribed temperature environment and the prescribed degree of stretching to adjust the physical properties, and/or relaxation operation carried out with the prescribed temperature environment and the prescribed degree of relaxation to reduce the stretching stress. The relaxation operation may also be carried out after the stretching operation. The heat treatment can be carried out using a tenter or roll stretcher.

A method of producing a microporous membrane by a dry lamellar pore opening method will be described as an example. In the dry lamellar pore opening method, a nonporous precursor in which numerous lamellar structures are bonded via tie molecules, is stretched to cleave the lamellar interface and thereby form pores, without using a solvent such as water or an organic solvent.

A dry lamellar pore opening method preferably involves (i) a step of extruding a nonporous precursor (highly oriented raw film) formed from a resin composition containing polyolefin and a thermoplastic elastomer as desired, and (ii) a step of uniaxial stretching the extruded nonporous precursor. The microporous film obtained by the dry lamellar pore-forming method and including steps (i) and (ii) can also be functionalized after the coating, dipping or impregnation step, etc.

Step (i) can be carried out by a conventional extrusion method (single screw, twin screw extrusion method). The extruder may be provided with a T-die or a circular die with elongated holes.

The uniaxial stretching in step (ii) may be carried out in the manner described above. The longitudinal direction (MD) stretching may include both cold stretching and hot stretching.

From the viewpoint of suppressing the internal distortion of the nonporous precursor, the nonporous precursor may be annealed during step (i), after step (ii), or prior to the stretching in step (ii). The annealing may be carried out in a range, for example, between a temperature lower by 50° C. than the melting point of the polypropylene resin (A) and a temperature lower by 10° C. than the melting point of the polypropylene resin (A), or in a range between a temperature lower by 50° C. than the melting point of the polypropylene resin (A) and a temperature lower by 15° C. than the melting point of polypropylene resin (A).

<Electric Storage Device>

The electric storage device according to other embodiment of the present invention is provided with a positive electrode, negative electrode and separator comprising the aforementioned microporous membranes. Specific examples of the electric storage device include a lithium secondary battery, lithium-ion secondary battery, sodium secondary battery, sodium-ion secondary battery, magnesium secondary battery, magnesium-ion secondary battery, calcium secondary battery, calcium-ion secondary battery, aluminum secondary battery, aluminum-ion secondary batteries, nickel-metal hydride battery, nickel cadmium battery, electric double layer capacitor, lithium-ion capacitor, redox flow battery, lithium sulfur battery, lithium air battery, and zinc air battery. Among them, from the viewpoint of practicality, a lithium secondary battery, lithium-ion secondary battery, nickel-metal hydride battery, or lithium-ion capacitor is preferable, and a lithium-ion secondary battery is more preferable.

The electric storage device can be manufactured, for example, by stacking the positive electrode and the negative electrode via the aforementioned separator interposed therebetween and winding them if necessary to prepare a laminated electrode body or a wound electrode body, housing the body into a casing, connecting the positive and negative electrodes to positive and negative electrode terminals via a lead body, etc., injecting to the casing a nonaqueous electrolytic solution containing a nonaqueous solvent such as a linear or cyclic carbonate, etc., and an electrolyte such as a lithium salt, etc., and then sealing the casing.

EXAMPLES

The present invention will now be explained in greater detail by examples and comparative examples, with the understanding that the invention is not limited to the examples so long as its gist is maintained.

First Embodiment

The methods of evaluating the starting materials used and the various properties were as follows.
(1) Measurement of Melt Flow Rate (MFR)
A Melt Flow Rate (MFR) was measured in accordance with JIS K 7210 for a polypropylene resin and an elastomer at 230° C. with 2.16 kg (units: g/10 minutes). The MFR of a polyethylene resin was taken as the value measured under conditions of 190° C. and 2.16 kg (units: g/10 minutes).
(2) Measurement of Crystalline Melting Point Peak (Tm) and Glass Transition Temperature (Tg)
A crystalline melting point peak was obtained as a peak value in a heat generating curve observed when 5 to 10 mg of a polymer sample was heated from room temperature to 250° C. at a rate of 20° C./minute using a heat flux type DSC, and subsequently cooled to a room temperature at a rate of 20° C./minute followed by again heated at a rate of 20° C./minute. If two peaks are observed, the peak having a larger heat generating area was selected.

Properties of various microporous membranes were measured in the following manner.

A glass transition temperature was obtained as a center value in a glass transition curve observed when 5 to 10 mg of a polymer sample was heated from room temperature to 250° C. at a rate of 20° C./minute using a heat flux type DSC, and subsequently cooled to room temperature at a rate of 20° C./minute followed by again heated at a rate of 20° C./minute.
(3) Thickness (μm)
An IDC112 Digimatic Indicator by Mitsutoyo Corp. was used to measure the thickness of the porous film at room temperature (23±2° C.).
(4) Porosity (%)
A 5 cm×5 cm square sample was cut out from the porous film, and the porosity was calculated from the volume and weight of the sample using the following formula.

Porosity (%)=(volume ($cm^3$)−weight (g)/resin composition density (g/$cm^3$))/volume ($cm^3$)×100

(5) Air Permeability Resistance (Second/100 cc)
Air permeability resistance of a separator comprising a microporous membrane was measured using a Gurley type air permeability tester, according to JIS P-8117.

(6) Puncture Strength (gf)
A separator was set with a sample holder having opening diameters of 11.3 mm, using a compression tester. Subsequently, a puncture test was carried out by contacting the center of the set separator and a needle tip with curvature radius of 0.5 mm under conditions with a puncture speed of 25 mm/minute and an atmospheric temperature of 25° C. and the puncture strength (gf) was obtained as the maximum puncture load.
(7) Tensile Test
Tensile strength of MD and TD directions was obtained as strength at break using Instron Model 4201 according to the procedure of ASTM-882.
(8) Heat Shrinkage Ratio
In order to obtain the thermal shrinkage ratio, a 5 cm×5 cm square sample was cut out from the microporous membrane, marked at 9 locations at 2 cm intervals, and wrapped in paper. The marked sample was subjected to heat treatment at a prescribed temperature for 1 hour, and subsequently cooled to room temperature, and the lengths in MD and TD directions respectively were measured at three locations for each direction to determine the shrinkage ratio.
(9) Observation of Elastomer Morphology
An elastomer portion was dyed using an osmium compound or a ruthenium compound and observed using a transmission electron microscopy (TEM). In MD and TD directions of the dyed portion, the longest values were measured for each direction, and a MD/TD ratio was obtained.

Example 1

<Preparation of Polypropylene Resin Composition>
Pellets of an ultra-high molecular weight polypropylene resin (PP, MFR=0.25) and an ethylene/1-butene copolymer (C2/C4: density=0.893 g/$cm^3$, melting point=80° C., MFR=6.7) were dry-blended in a weight ratio of PP:C2/C4=95:5 (weight %), and then melt-kneaded using ZSK 40 (L/D=46 manufactured by Coperion GmbH). The cylinder temperature during the kneading was constantly 230° C., extrusion rate 50 kg/Hr, screw revolution 200 rpm and resin temperature 288° C. In order to minimize decomposition and deterioration of the resin, production lines from a resin feed inlet of a hopper to raw material tanks were hermetically sealed, nitrogen was continuously flowed from the lower end of the hopper, and the oxygen concentration in the vicinity of the raw material feed inlet was controlled to 50 ppm or less. In addition, all of the vent lines were completely sealed to eliminate air leakage into the cylinder. Due to this oxygen concentration reducing effect, the decomposition and deterioration of the polymer was sufficiently suppressed even at elevated temperatures, enabling the ethylene/1-butene copolymer to be micro-dispersed. After the melt kneading, strands were drawn from a die (8 holes), cooled on a water-cooling bath, and then cut them using a pelletizer to obtain pellets.
<Preparation of Microporous Membrane (Single Layer)>
Pellets were melted in a 2.5 inch extruder (melting temperature of 221° C.), and supplied to an annular die using a gear pump. A die temperature was set to 230° C., and the molten polymer was cooled by blown air and then wound into a roll. The extruded precursor (raw film) had a thickness of 27 m and then the raw film was annealed at 130° C. for 15 minutes. Next, the annealed film was cold stretched to 21% at room temperature, then hot stretched to 156% at 120° C., and relaxed to 126% at 125° C. After pore opening upon stretching of the film, the two layers of the thin membrane were delaminated and the physical property of each was measured. The results are shown in Table 1.

Example 2

A microporous membrane was manufactured and the physical properties were measured in the same manner and condition as Example 1 with the exception of the weight ratio of PP:C2/C4=90:10 (weight %). The results are shown in Table 1 and the cross-section surface of MD-TD direction of the obtained microporous membrane was observed by TEM. Here, it was confirmed that in all Examples, the elastomers were arranged in parallel to MD direction of the microporous membrane, which was the same as Example 2.

Example 3

A microporous membrane was manufactured and evaluated in the same manner and condition as Example 1 with the exception of the weight ratio of PP:C2/C4=85:15 (weight %). The results are shown in Table 1.

Example 4

A microporous membrane was manufactured and evaluated in the same manner and condition as Example 1 with the exception of using a polypropylene resin (PP, MFR=0.80). The results are shown in Table 1.

Example 5

A microporous membrane was manufactured and evaluated in the same manner and condition as Example 4 with the exception of the weight ratio of PP:C2/C4=90:10 (weight %). The results are shown in Table 1.

Example 6

A microporous membrane was manufactured and evaluated in the same manner and condition as Example 4 with the exception of the weight ratio of PP:C2/C4=85:15 (weight %). The results are shown in Table 1.

Examples 7 and 8

A microporous membrane was manufactured and evaluated in the same manner and condition as in Example 1 or 4 with the exception of using a hydrogenated compound of a polystyrene-polybutadiene-polystyrene block copolymer (SEBS: glass transition temperature of styrene was 60° C. and MFR=4.5). The results are shown in Table 1.

By TEM observation from Examples 1 to 8, it is confirmed that no elastomers were present in the fibrils and the elastomers were present in the matrix portion.

Comparative Examples 1 and 2

A microporous membrane was manufactured and evaluated in the same manner and condition as in Example 1 not by using an ethylene/1-butene copolymer and using only the PP described in Table 2. The results are shown in Table 2.

Example 9

A microporous membrane was manufactured and evaluated in the same manner and condition as Example 1 with the exception of the weight ratio of PP:C2/C4=75:25. When the obtained microporous membrane was delaminated, adhesiveness was slightly observed. The results are shown in Table 2.

Example 10

A microporous membrane was manufactured and evaluated in the same manner and condition as Example 1 or 4 with the exception of using an ethylene/octene copolymer (C2/C8: density=0.877 g/cm$^3$, melting point=69° C., MFR=5) as an elastomer. The results are shown in Table 4.

[Example 11]<Preparation of Polypropylene Resin Composition>

Pellets of an ultra-high molecular weight polypropylene resin (PP, MFR=0.25) and an ethylene/1-butene copolymer (C2/C4: density=0.893 g/cm$^3$, melting point=80° C., MFR=6.7) were dry-blended in a weight ratio of PP:C2/C4=95:5 (weight %), and then melt-kneaded using ZSK 40 (L/D=46 manufactured by Coperion GmbH). The cylinder temperature during the kneading was constantly 230° C., extrusion rate of 50 kg/Hr, screw revolution of 200 rpm and resin temperature of 288° C. In order to minimize decomposition and deterioration of the resin, production lines from a resin feed inlet of a hopper to raw material tanks were hermetically sealed, nitrogen was continuously flowed from the lower end of the hopper, and the oxygen concentration in the vicinity of the raw material feed inlet was controlled to 50 ppm or less. In addition, all of the vent lines were completely sealed to eliminate air leakage into the cylinder. Due to this oxygen concentration reducing effect, the decomposition and deterioration of the polymer was sufficiently suppressed even at elevated temperatures, enabling the ethylene/1-butene copolymer to be micro-dispersed. After the melt kneading, strands were drawn from a die (8 holes), cooled on a water cooling bath, and then cut using a pelletizer to obtain pellets.
<Manufacturing of Multi-Layered Microporous Membrane>

An ultra-high molecular weight polypropylene resin (PP, MFR=0.25) and the above pellets were dry-blended in a weight ratio of PP:pellet=90:10 (weight %), then melted in a 2.5 inch extruder, and supplied to an annular die using a gear pump. The charging ratio (PP:C2/C4) of the resins is PP:C2/C4=95:5 (weight %).

A die temperature was set to 260° C., and the molten polymer was cooled by blown air and then wound into a roll. In the same manner, a polyethylene resin (PE, MFR=0.38, density=0.963 g/cm$^3$) was melted in a 2.5 inch extruder, and supplied to an annular die using a gear pump. A die temperature was set to 230° C., and the molten polymer was cooled by blown air followed and then wound into a roll. The thickness of the PP and the PE precursor (raw film) wound to a roll was 5 µm, respectively, and subsequently, the PP and PE precursor were adhered together to obtain a raw film with a three-layer structure of PP/PE/PP in this order. The raw film was annealed at 125° C. for 20 minutes. Next, the annealed film was cold stretched to 15% at room temperature, then hot stretched to 150% at 115° C., and relaxed to 103% at 125° C. to form micropores. After the aforementioned pore opening upon stretching of the film, physical properties of the microporous membrane were measured. After stretching the PP and PE layers followed by delaminating them, the MFR of each layer was measured. The results are shown in Table 4.

By TEM observation of the microporous membranes of Examples 10 and 11, it is confirmed that neither of the elastomers was present in a fibril of the PP layer, however, both were present in a matrix region.

Comparative Examples 3 and 4

The microporous membrane having a three-layer structure was manufactured and evaluated not by using an ethylene/1-butene copolymer, but by using the PP and PE shown in Table 4 in the similar method and conditions as Example 11. The results are shown in Table 4.
[Heat Shrinkage Ratio]

Heat shrinkage ratio was measured for the microporous membranes manufactured in Example 2 and Comparative Example 2. The shrinking temperature was 105° C., 120° C., and 130° C., respectively. The results are shown in Table 3.

TABLE 1

| | | Examples | | | | | | | |
|---|---|---|---|---|---|---|---|---|---|
| Items | Units | 1 | 2 | 3 | 4 | 5 | 6 | 7 | 8 |
| Elastomer type | — | C2/C4 | C2/C4 | C2/C4 | C2/C4 | C2/C4 | C2/C4 | SEBS | SEBS |
| Hard segment Tm or Tg | °C. | 80 | 80 | 80 | 80 | 80 | 80 | 60 | 60 |
| MFR PP | g/10 min | 0.25 | 0.25 | 0.25 | 0.80 | 0.80 | 0.80 | 0.25 | 0.80 |
| Elastomer | g/10 min | 6.7 | 6.7 | 6.7 | 6.7 | 6.7 | 6.7 | 4.5 | 4.5 |
| Microporous membrane | g/10 min | 0.35 | 0.40 | 0.43 | 0.90 | 0.93 | 0.96 | 0.31 | 0.65 |
| Elastomer content | weight % | 5 | 10 | 15 | 5 | 10 | 15 | 5 | 5 |
| Thickness | μm | 14 | 11 | 15 | 13 | 14 | 15 | 14 | 15 |
| Porosity | % | 42 | 41 | 48 | 45 | 41 | 47 | 48 | 47 |
| Air permeability resistance | sec/100 ml | 252 | 270 | 350 | 215 | 242 | 285 | 243 | 260 |
| Puncture strength | gf | 431 | 452 | 440 | 300 | 340 | 350 | 432 | 350 |
| Tensile test Strength of MD direction | kg/cm² | 2010 | 2620 | 2910 | 1560 | 1730 | 1920 | 2100 | 1650 |
| Strength of TD direction | kg/cm² | 155 | 159 | 162 | 122 | 156 | 158 | 151 | 143 |
| Elastomer parallel to MD | | Present | Present | Present | Present | Present | Present | Present | Present |
| MD/TD | | ≥1.5 | ≥1.5 | ≥1.5 | ≥1.5 | ≥1.5 | ≥1.5 | ≥1.5 | ≥1.5 |

TABLE 2

| | | Comparative Examples | | Example |
|---|---|---|---|---|
| Items | Units | 1 | 2 | 9 |
| Elastomer type | — | — | — | C2/C4 |
| Hard segment Tm or Tg | °C. | — | — | 80 |
| MFR PP | g/10 min | 0.25 | 0.80 | 0.25 |
| Elastomer | g/10 min | — | — | 6.7 |
| Microporous membrane | g/10 min | 0.28 | 0.87 | 0.62 |
| Elastomer content | weight % | 0 | 0 | 25 |
| Thickness | μm | 14 | 14 | 16 |
| Porosity | % | 44 | 46 | 28 |
| Air permeability resistance | sec/100 ml | 280 | 180 | 521 |
| Puncture strength | gf | 310 | 280 | 340 |
| Tensile test Strength of MD direction | kg/cm² | 1850 | 1540 | 1850 |
| Strength of TD direction | kg/cm² | 151 | 150 | 155 |
| Elastomer parallel to MD | | — | — | Present |
| MD/TD | | — | — | ≥1.5 |

TABLE 3

| | | Sample | |
|---|---|---|---|
| Temperature | Heat shrinkage ratio | Comparative Example 2 | Example 2 |
| 105° C. | MD | 16.3 | 8.1 |
| | TD | −0.6 | −0.6 |
| 120° C. | MD | 26.9 | 15.0 |
| | TD | −1.3 | −1.3 |
| 130° C. | MD | 33.8 | 20.6 |
| | TD | −1.3 | −1.3 |

TABLE 4

| | | Examples | | Comparative Examples | |
|---|---|---|---|---|---|
| Items | Units | 10 | 11 | 3 | 4 |
| Elastomer type | — | C2/C8 | C2/C4 | — | — |
| Hard segment Tm | °C. | 69 | 80 | — | — |
| MFR PP | g/10 min | 0.25 | 0.25 | 0.25 | 0.25 |
| PE | g/10 min | — | 0.38 | 0.38 | 0.65 |
| Elastomer | g/10 min | 5 | 6.7 | — | — |
| PP microporous membrane | g/10 min | 0.32 | 0.32 | 0.28 | 0.25 |
| PE microporous membrane | g/10 min | — | 0.4 | 0.4 | 0.7 |
| Elastomer content | weight % | 5 | 5 | — | — |
| Thickness | μm | 14 | 14 | 15 | 15 |
| Porosity | % | 44 | 47 | 46 | 43 |
| Air permeability resistance | sec/100 ml | 232 | 266 | 257 | 283 |
| Puncture strength | gf | 437 | 461 | 403 | 382 |
| Tensile test MD direction strength | kg/cm² | 2160 | 2430 | 1830 | 1550 |
| TD direction strength | kg/cm² | 151 | 160 | 142 | 140 |

TABLE 4-continued

| Items | Units | Examples | | Comparative Examples | |
|---|---|---|---|---|---|
| | | 10 | 11 | 3 | 4 |
| Elastomer parallel to MD | | Present | Present | Absent | Absent |
| MD/TD | | ≥1.5 | ≥1.5 | N.D. | N.D. |

Second Embodiment

The methods of evaluating the starting materials used and the various properties were as follows.
[Measurement of Melt Flow Rate (MFR)]
A Melt Flow Rate (MFR) was measured in accordance with JIS K 7210 for a polypropylene resin, thermoplastic elastomer, and separator at 230° C. with 2.16 kg (units: g/10 minutes).
[Thickness (μm)]
An IDC112 Digimatic Indicator by Mitsutoyo Corp. was used to measure the thickness of the porous film at room temperature (23±2° C.).
[Porosity (%)]
A 5 cm×5 cm square sample was cut out from the porous film, and the porosity was calculated from the volume and weight of the sample using the following formula.

Porosity (%)=(volume (cm$^3$)–weight (g)/resin composition density (g/cm$^3$))/volume (cm$^3$)×100

Figure 3:
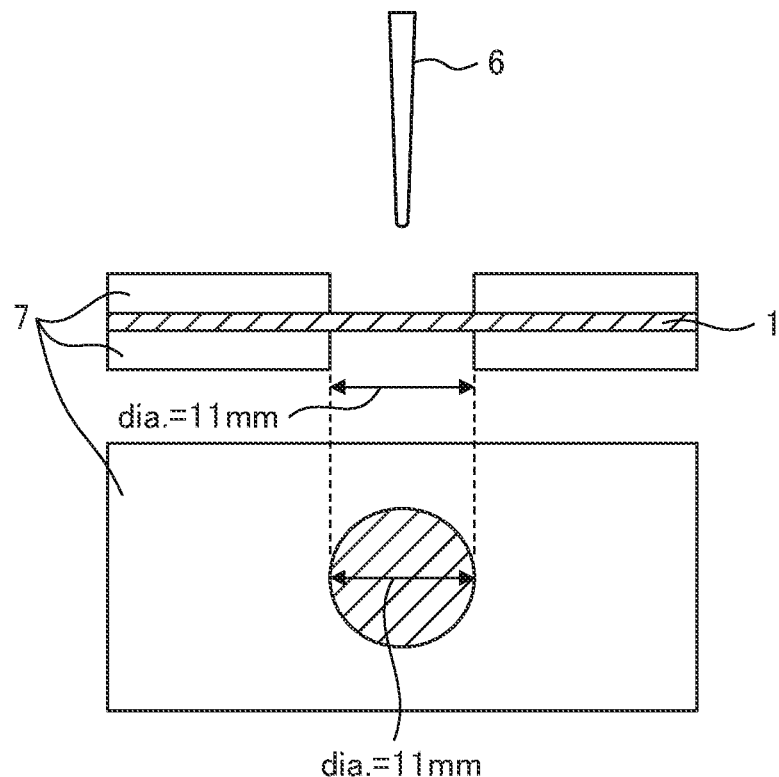
FIG. 3 is a schematic diagram for illustration of puncture test conditions and puncture depth, (a) being a side view and plate top view representing the relationship among the needle, the separator for an electric storage device and the separator holding plate at the start of the puncture test, (b) being a side view representing the positional relationship between the needle and the separator for an electric storage device upon contact, and (c) being a side view representing the positional relationship between the needle and the separator for an electric storage device during measurement of the puncture depth.
Figure 3:
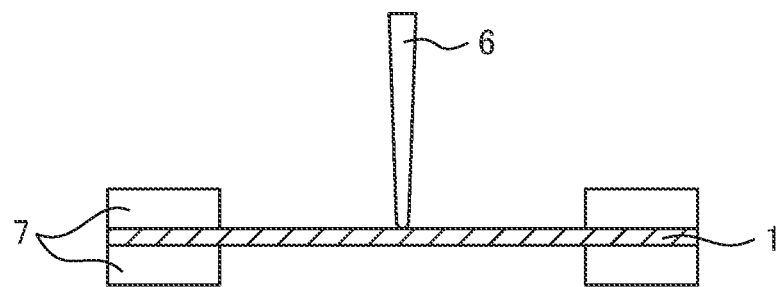
Figure 3:
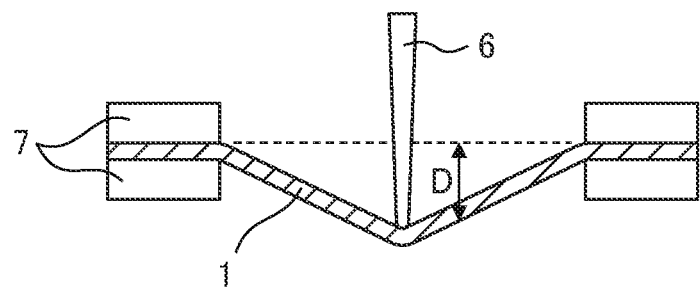

[Air Permeability Resistance (Second/100 cc)]
Air permeability resistance of a separator comprising a microporous membrane was measured using a Gurley type air permeability tester, according to JIS P-8117.
[Average Longest Pore Diameter (Nm) and Pore Diameter Ratio]
The average longest pore diameter of the microporous membrane was obtained by observing the surface of the microporous membrane with SEM and measuring the pore diameter of the SEM photograph. Specifically, the surface of the microporous membrane was observed by SEM at 30,000 magnification, the longest pore diameters of the micropores within the photograph range of 4.2 μm×3 μm were measured, and the average value was calculated to obtain the average longest pore diameter. Also, the pore diameter in the longest pore direction and that in the direction perpendicular to the longest pore direction are measured, calculating the average values, dividing the average longest pore diameter by the average value of the pore diameter in the direction perpendicular to the longest pore direction, and then calculating the pore diameter ratio.
[Puncture Strength (gf) and Puncture Depth (mm)]
FIG. 3 shows a schematic diagram for illustration of the puncture test conditions and the puncture depth. During the puncture test, a needle (6) having a hemispherical tip with a radius of 0.5 mm was prepared, separator (1) was sandwiched between two plates (7, 7) having opening diameters (dia.) of 11 mm, and the needle (6), separator (1) and plates (7, 7) were set in the positional relationship shown in FIG. 3(a). An MX2-50N by Imada Co., Ltd. was used for a puncture test under conditions with a needle tip curvature radius of 0.5 mm, a separator-holding plate opening diameter of 11 mm and a puncture speed of 120 mm/second, and the needle (6) and separator (1) were contacted (FIG. 3(b)). Then, the maximum puncture load (i.e. puncture strength (gf)) was measured, the degree of needle displacement (mm) from the moment after contact of the needle with the separator until reaching the maximum puncture load (puncture strength) was measured as the puncture depth (D), and the depth-strength curve was obtained (FIG. 3(c)).
[Heat Shrinkage Ratio]
In order to obtain the thermal shrinkage ratio, a 5 cm×5 cm square sample was cut out from the microporous membrane, marked at 9 locations at 2 cm intervals, and wrapped in paper. The marked sample was subjected to heat treatment at a prescribed temperature for 1 hour, subsequently cooled to room temperature, and the lengths in the MD and TD directions respectively were measured at three locations for each direction to determine the shrinkage ratio.

Example 1

<Preparation of Polypropylene Resin Composition>
Pellets of an ultra-high molecular weight polypropylene resin (PP, MFR=0.25) and an ethylene/1-butene copolymer (C2/C4: density=0.893 g/cm$^3$, melting point=80° C., MFR=6.7) were dry-blended in a weight ratio of PP:C2/C4=50:50 (weight %) and then melt-kneaded using ZSK 40 (L/D=46 manufactured by Coperion GmbH). In order to minimize decomposition and deterioration of the resin, production lines from a resin feed inlet of a hopper to raw material tanks were hermetically sealed, nitrogen was continuously flowed from the lower end of the hopper, and the oxygen concentration in the vicinity of the raw material feed inlet was controlled to 50 ppm or less. In addition, all of the vent lines were completely sealed to eliminate air leakage into the cylinder. Due to this oxygen concentration reducing effect, the decomposition and deterioration of the polymer was sufficiently suppressed even at elevated temperatures, enabling the ethylene/1-butene copolymer to be microdispersed. After the melt kneading, strands were drawn from a die (8 holes), cooled on a water-cooling bath, and then cut them using a pelletizer to obtain pellets.
<Preparation of Microporous Membrane (Single Layer)>
An ultra-high molecular weight polypropylene resin (PP, MFR=0.25) and the above pellets were dry-blended in a weight ratio of PP:pellet=90:10 (weight %), melted in a 2.5 inch extruder, and supplied to an annular die using a gear pump. Here, the feeding ratio of the charged resin is PP:C2/C4=95:5 (weight %).
The die temperature was set to 230° C., and the molten polymer was cooled by blown air and then wound into a roll. The extruded precursor (raw film) had a thickness of 15 μm and then the raw film was annealed at 130° C. for 15 minutes. Next, the annealed film was cold stretched to 21% at room temperature, then hot stretched to 156% at 120° C., and relaxed to 126% at 125° C. to form micropores. Physical properties of the microporous membrane were measured after the aforementioned pore opening upon stretching of the film. The results are shown in Table 5. The separator comprising the microporous membrane that was produced according to this example has in the puncture test the two maximum values of the puncture strength, and the maximum-stress puncture depth is as large as 10.5 mm, and the maximum puncture strength 572 gf/(mg/cm$^2$). The longest pore diameter of the separator was 173 nm, and the pore diameter ratio 6.4.

Examples 2 to 6, Comparative Examples 1 to 5

Microporous membranes were obtained in the same manner as in Example 1 with the exception of changing the raw materials, film forming conditions or separator physical properties as shown in Table 5, and the obtained microporous membranes were evaluated. Note that in Table 5, a C2/C8 elastomer described in Example 5 denotes an ethylene/octene copolymer, and a C3/C4 elastomer described in Example 6 denotes a propylene/1-butene copolymer.

Example 7

<Preparation of Polypropylene Resin Composition>

A polypropylene resin composition was prepared in the same manner as Example 1.

<Manufacturing of Separator Having Three Layers of Microporous Membranes)>

An ultra-high molecular weight polypropylene resin (PP, MFR=0.25) and the aforementioned pellets were dry-blended in a weight ratio of PP:pellet=90:10 (weight %), melted in a 2.5 inch extruder, and supplied to an annular die using a gear pump. Here, the feeding ratio of the charged resin is PP:C2/C4=95:5 (weight %).

A die temperature was set to 240° C., and the molten polymer was cooled by blown air followed by wound into a roll. The thickness of the extruded precursor (raw film) was 6 μm.

A high molecular weight polyethylene resin (PE, MFR=0.38) was melted in a 2.5 inch extruder, and supplied to an annular die using a gear pump.

A die temperature was set to 210° C., and the molten polymer was cooled by blown air followed by wound into a roll. The thickness of the extruded precursor (raw film) was 6 μm.

The PP precursor obtained and the PE precursor obtained were stacked to three layers of PP precursor/PE precursor/PP precursor in this order and laminated at 120° C. to obtain a raw film with the three-layer structure. The raw film was annealed at 125° C. for 20 minutes. Next, the annealed film was subjected to cold stretching to 15% at room temperature, then hot stretching to 150% at 115° C., and relaxation to 103% at 125° C. to form the separator having the three-layer structure of the microporous membranes. After the aforementioned pore opening upon stretching of the separator, physical properties of the separator were measured. After stretching the PP and PE layers and then delaminating them, the MFR of each layer was measured.

Comparative Examples 6 and 7

The separator having a three-layer structure of the microporous membranes was manufactured and evaluated not by using an ethylene/1-butene copolymer as a polypropylene layer, but by using the PP and PE shown in Table 6 in the similar method and conditions as Example 7. The results on Example 7, Comparative Examples 6 and 7 are shown in Table 6.

TABLE 5

| | | | Example 1 | Example 2 | Example 3 | Example 4 | Example 5 | Example 6 |
|---|---|---|---|---|---|---|---|---|
| Raw material | Polyolefin resin | — | PP | PP | PP | PP | PP | PP |
| | MFR(PP) | g/10 min | 0.25 | 0.25 | 0.25 | 0.4 | 0.25 | 0.25 |
| | Elastomer | — | C2/C4 | C2/C4 | C2/C4 | C2/C4 | C2/C8 | C3/C4 |
| | MFR(elastomer) | g/10 min | 6.7 | 6.7 | 6.7 | 6.7 | 5 | 7 |
| | Elastomer content ratio | weight % | 5 | 10 | 10 | 5 | 5 | 5 |
| Membrane formation | Die temperature | ° C. | 230 | 230 | 220 | 230 | 230 | 230 |
| Separator | MFR(separator) | g/10 min | 0.35 | 0.4 | 0.4 | 0.6 | 0.32 | 0.30 |
| | Thickness | μm | 14 | 12 | 15 | 15 | 14 | 13 |
| | Weight | mg/cm$^2$ | 0.73 | 0.70 | 0.74 | 0.67 | 0.73 | 0.72 |
| | Porosity | % | 44 | 37 | 44 | 51 | 43 | 39 |
| | Longest pore diamter | nm | 173 | 151 | 177 | 204 | 172 | 69 |
| | Pore diameter ratio | — | 6.4 | 5.0 | 6.7 | 6.9 | 6.3 | 5.7 |
| | Orientation direction of longest pore diameter | — | Oriented to MD direction | Oriented to MD direction | Oriented to MD direction | Oriented to MD direction | Oriented to MD direction | Oriented to MD direction |
| | Air permeability resistance | sec/100 ml | 278 | 525 | 422 | 159 | 270 | 282 |
| | Maximum puncture strength | gf | 420 | 449 | 454 | 354 | 418 | 402 |
| | Maximum puncture strength | gf/(mg/cm$^2$) | 572 | 644 | 616 | 528 | 573 | 558 |
| | Maximum-stress puncture depth | mm | 10.5 | 11.1 | 9.3 | 11.8 | 10.2 | 9.0 |
| | Number of maximum puncture strength | — | Two or more | Two or more | Two or more | Two or more | Two or more | Two or more |
| | Exhibited maximum puncture strength | — | Second or subsequent maximum | Second or subsequent maximum | Second or subsequent maximum | Second or subsequent maximum | Second or subsequent maximum | Second or subsequent maximum |

TABLE 5-continued

|  |  |  | Comparative Example 1 | Comparative Example 2 | Comparative Example 3 | Comparative Example 4 | Comparative Example 5 |
|---|---|---|---|---|---|---|---|
| Raw material | Polyolefin resin | — | PP | PP | PP | PP | PP |
|  | MFR(PP) | g/10 min | 0.25 | 0.25 | 4 | 0.8 | 0.4 |
|  | Elastomer | — | — | — | C2/C4 | — | — |
|  | MFR(elastomer) | g/10 min | — | — | 6.7 | — | — |
|  | Elastomer content ratio | weight % | — | — | 10 | — | — |
| Membrane formation | Die temperature | °C. | 240 | 230 | 210 | 210 | 230 |
| Separator | MFR(separator) | g/10 min | 0.28 | 0.28 | 4.4 | 0.9 | 0.5 |
|  | Thickness | μm | 13 | 14 | 13 | 13 | 15 |
|  | Weight | mg/cm$^2$ | 0.65 | 0.66 | 0.70 | 0.67 | 0.67 |
|  | Porosity | % | 45 | 47 | 41 | 43 | 51 |
|  | Longest pore diamter | nm | 191 | 210 | 170 | 242 | 233 |
|  | Pore diameter ratio | — | 6.2 | 7.0 | 4.5 | 8.1 | 7.9 |
|  | Orientation direction of longest pore diameter | — | Oriented to MD direction | Oriented to MD direction | Oriented to MD direction | Oriented to MD direction | Oriented to MD direction |
|  | Air permeability resistance | sec/100 ml | 315 | 280 | 542 | 191 | 194 |
|  | Maximum puncture strength | gf | 298 | 312 | 202 | 239 | 304 |
|  | Maximum puncture strength | gf/(mg/cm$^2$) | 458 | 473 | 289 | 359 | 454 |
|  | Maximum-stress puncture depth | mm | 3.2 | 3.2 | 3.4 | 3.3 | 3.4 |
|  | Number of maximum puncture strength | — | Two or more | Two or more | Two or more | Two or more | Two or more |
|  | Exhibited maximum puncture strength | — | First maximum | First maximum | First maximum | First maximum | First maximum |

TABLE 6

|  |  |  | Example 7 | Comparative Example 6 | Comparative Example 7 |
|---|---|---|---|---|---|
| Polypropylene layer | MFR(PP) | g/10 min | 0.25 | 0.25 | 0.25 |
|  | Elasotmer | — | C2/C4 | — | — |
|  | MFR (elastomer) | g/10 min | 6.7 | — | — |
|  | Elastomer content | wt % | 5 | — | — |
| Polyethyleene layer | MFR (PE raw material) | g/10 min | 0.38 | 0.38 | 0.65 |
|  | MFR (PE layer) | g/10 min | 0.40 | 0.40 | 0.70 |
| Three-layer separator | Thickness | μm | 14 | 13 | 15 |
|  | Weight | mg/cm$^2$ | 0.70 | 0.66 | 0.75 |
|  | Porosity | % | 46 | 46 | 44 |
|  | Longest pore diameter | nm | 175 | 201 | 198 |
|  | Pore diameter ratio | — | 6.4 | 6.8 | 6.6 |
|  | Orientation direction of longest pore diameter | — | Oriented to MD direction | Oriented to MD direction | Oriented to MD direction |
|  | Air permeability resistance | sec./100 ml | 254 | 268 | 295 |
|  | Maximum puncture strength | gf | 392 | 285 | 302 |
|  | Maximum puncture strength | gf/(mg/cm$^2$) | 558 | 435 | 403 |
|  | Maximum-stress puncture strength | mm | 10.2 | 3.3 | 3.3 |
|  | Number of maximum of puncture strength | — | Two or more | Two or more | Two or more |
|  | Exhibited maximum puncture strength | — | Second or subsequent maximum | First maximum | First maximum |

Third Embodiment

The methods of evaluating the starting materials used and the various properties were as follows.

(1) Measurement of Melt Flow Rate (MFR)

A Melt Flow Rate (MFR) was measured in accordance with JIS K 7210 for a polypropylene resin and an elastomer at 230° C. with 2.16 kg (units: g/10 minutes). The Melt Flow Rate (MFR) of a polyethylene resin was measured at 190° C. with 2.16 kg (units: g/10 minutes).

(2) Measurement of Crystalline Melting Point Peak (Tm) and Glass Transition Temperature (Tg)

A crystalline melting point peak is obtained as a peak value in a heat generating curve observed when 5 to 10 mg of a polymer sample was heated from room temperature to 250° C. at a rate of 20° C./minute using a heat flux type DSC, and subsequently cooled to room temperature at a rate of 20° C./minute followed by again heated at a rate of 20° C./minute. If two peaks are observed, the peak having a larger heat generating area is selected.

Properties of various microporous membranes are measured in the following manner.

A glass transition temperature is obtained as a center value in a glass transition curve observed when 5 to 10 mg of a polymer sample was heated from room temperature to 250° C. at a rate of 20° C./minute using a heat flux type DSC, and subsequently cooled down to room temperature at a rate of 20° C./minute followed by again heated at a rate of 20° C./minute.

(3) Thickness (μm)

An IDC112 Digimatic Indicator by Mitsutoyo Corp. was used to measure the thickness of the porous film at room temperature (23±2° C.).

(4) Porosity (%)

A 5 cm×5 cm square sample was cut out from the porous film, and the porosity was calculated from the volume and weight of the sample using the following formula.

Porosity (%) (volume (cm$^3$)−weight (g)/resin composition density (g/cm$^3$))/volume (cm$^3$)×100

(5) Air Permeability Resistance (Sec/100 cc)

Air permeability resistance of a separator comprising a microporous film was measured using a Gurley type air permeability tester, according to JIS P-8117.

(6) Puncture Strength (gf)

A separator was set with a sample holder having opening diameters of 11.3 mm, using a compression tester. Subsequently, a puncture test was carried out by contacting the center of the set separator and a needle tip with curvature radius of 0.5 mm under conditions with a puncture speed of 25 mm/minute and an atmospheric temperature of 25° C. and the puncture strength (gf) was obtained as the maximum puncture load.

(7) Tensile Test

Tensile strength of MD and TD directions is obtained as strength at break using Instron Model 4201 according to the procedure of ASTM-882.

(8) Heat Shrinkage Ratio

In order to obtain the thermal shrinkage ratio, a 5 cm×5 cm square sample was cut out from the microporous membrane, marked at 9 locations at 2 cm intervals, and wrapped in paper. The marked sample was subjected to heat treatment at a prescribed temperature for 1 hour, and subsequently cooled to room temperature, and the lengths in MD and TD directions respectively were measured at three locations for each direction to determine the shrinkage ratio.

(9) Observation of Elastomer Morphology

An elastomer portion was dyed using an osmium compound or a ruthenium compound and observed using a transmission electron microscopy (TEM). In MD and TD directions of the dyed portion, the longest values were measured, respectively and MD/TD ratio was obtained.

Example 1

<Preparation of Polypropylene Resin Composition>

Pellets of an ultra-high molecular weight polypropylene resin (PP, MFR=0.25) and an ethylene/1-butene copolymer (C2/C4: density=0.893 g/cm$^3$, melting point=80° C., MFR=6.7) were dry-blended in a weight ratio of PP:C2/C4=50:50 (weight %), and then melt-kneaded using ZSK 40 (L/D=46 manufactured by Coperion GmbH). The cylinder temperature during the kneading was constantly 230° C., extrusion rate 50 kg/Hr, screw revolution 200 rpm and resin temperature 288° C. In order to minimize decomposition and deterioration of the resin, production lines from a resin feed inlet of a hopper to raw material tanks were hermetically sealed, nitrogen was continuously flowed from the lower end of the hopper, and the oxygen concentration in the vicinity of the raw material feed inlet was controlled to 50 ppm or less. In addition, all of the vent lines were completely sealed to eliminate air leakage into the cylinder. Due to this oxygen concentration reducing effect, the decomposition and deterioration of the polymer was sufficiently suppressed even at elevated temperatures, enabling the ethylene/i-butene copolymer to be micro-dispersed. After the melt kneading, strands were drawn from a die (8 holes), cooled on a water-cooling bath, and then cut using a pelletizer to obtain pellets.

<Preparation of Microporous Membrane (Single Separator Layer)>

Pellets were melted (melting temperature of 221° C.) in a 2.5 inch extruder, and supplied to an annular die using a gear pump. A die temperature was set to 230° C., and the molten polymer was cooled by blown air followed by wound into a roll. The extruded precursor (raw film) had a thickness of 27 μm and then the raw film was annealed at 130° C. for 15 minutes. Next, the annealed film was cold stretched to 21% at room temperature, then hot stretched to 156% at 120° C., and then relaxed to 126% at 125° C. to form micropores. After pore opening upon stretching of the film, two stacked layers were delaminated and physical property of each layer was measured. The results are shown in Table 7.

Example 2

A microporous membrane was manufactured and the physical properties were measured in the same manner and condition as Example 1 with the exception of the weight ratio of PP:C2/C4=90:10. The results are shown in Table 7 and the cross-section surface of MD-TD direction of the obtained microporous membrane was observed by TEM. Here, it was confirmed that in the examples and comparative examples excluding Comparative Examples 1 to 3, the elastomers were arranged in parallel to MD direction of the microporous membrane, which was the same as Example 2.

Example 3

A microporous membrane was manufactured and evaluated in the same manner and condition as Example 1 with the exception of the weight ratio of PP:C2/C4=85:15. The results are shown in Table 7.

Comparative Examples 1 and 2

A microporous membrane was manufactured and evaluated in the same manner and condition as in Example 1 not by using ethylene/1-butene and using only the PP described in Table 8. The results are shown in Table 8.

Comparative Example 3

A screw revolution of a twin-screw extruder was reduced to 100 rpm during melt kneading, and pellets were prepared by reducing dipspersibility of an ethylene/1-butene copolymer (C2/C4). A microporous membrane was manufactured in the same manner and condition as in Example 1 and subjected to TEM observation. The C2/C4 was not arranged to MD direction in the matrix and existed as a domain having a larger dispersing size. The results of physical properties of the microporous membrane are shown in Table 8.

Comparative Example 4

A microporous membrane was manufactured in the same manner and condition as in Example 1 with the exception of the weight ratio of PP:C2/C4=75:25. When the obtained microporous membrane was delaminated, adhesiveness was slightly observed. The results are shown in Table 8.

Example 4

A microporous membrane was manufactured and evaluated in the same manner and condition as in Example 1 with the exception of using a hydrogenated compound of a polystyrene-polybutadiene-polystyrene block copolymer (SEBS: glass transition temperature of 60° C. and MFR=4.5) as an elastomer. The results are shown in Table 7.

By TEM observation from Examples 1 to 4, it is confirmed that no elastomers exist in the fibrils and the elastomers exist in the matrix region.

Comparative Example 5

A microporous membrane was manufactured and evaluated in the same manner and condition as in Example 1 with the exception of using a polypropylene resin (PP, MFR of PP=0.80) and a hydrogenated compound of a polystyrene-polybutadiene-polystyrene block copolymer (SEBS: glass transition temperature of 60° C. and MFR=4.5) as an elastomer. The results are shown in Table 8.

Example 5

A microporous membrane was manufactured and evaluated in the same manner and condition as in Example 1 with the exception of using an ethylene/octene copolymer (C2/C8: density=0.877 g/cm$^3$, melting point=69° C., and MFR=5) as an elastomer. The results are shown in Table 10.

Example 6

A microporous membrane was manufactured and evaluated in the same manner and condition as in Example 1 with the exception of using a propylene/butene copolymer (C3/C4: density=0.882 g/cm$^3$, melting point=98° C., and MFR=7) as an elastomer. The results are shown in Table 10.

Example 7

A microporous membrane was manufactured and evaluated in the same manner and condition as Examples 1 with the exception of using a polypropylene resin (PP, MFR=0.5). The results are shown in Table 10.

Example 8

<Preparation of Polypropylene Resin Composition>

Pellets of an ultra-high molecular weight polypropylene resin (PP, MFR=0.25) and an ethylene/1-butene copolymer (C2/C4: density=0.893 g/cm$^3$, melting point=80° C., MFR=6.7) were dry-blended in a weight ratio of PP:C2/C4=95:5 (weight %), and then melt-kneaded using ZSK 40 (L/D=46 manufactured by Coperion GmbH). The cylinder temperature during the kneading was constantly 230° C., extrusion rate of 50 kg/Hr, screw revolution of 200 rpm and resin temperature of 288° C. In order to minimize decomposition and deterioration of the resin, production lines from a resin feed inlet of a hopper to raw material tanks were hermetically sealed, nitrogen was continuously flowed from the lower part of the hopper, and the oxygen concentration in the vicinity of the raw material feed inlet was controlled to 50 ppm or less. In addition, all of the vent lines were completely sealed to eliminate air leakage into the cylinder. Due to this oxygen concentration reducing effect, the decomposition and deterioration of the polymer was sufficiently suppressed even at elevated temperatures, enabling the ethylene/1-butene copolymer to be micro-dispersed. After the melt kneading, strands were drawn from a die (8 holes), cooled on a water-cooling bath, and then cut using a pelletizer to obtain pellets.

<Manufacturing of Separator Comprising Three Layers of Microporous Membranes>

Pellets of an ultra-high molecular weight polypropylene resin (PP, MFR=0.25) and the above pellets were dry-blended in a weight ratio of PP:pellet=90:10 (weight %), and then were melted in a 2.5 inch extruder, and supplied to an annular die using a gear pump. The feeding ratio (PP:C2/C4) of the charged resins is PP:C2/C4=95:5 (weight %).

A die temperature was set to 260° C., and the molten polymer was cooled by blown air followed by wound into a roll. In the same manner, a polyethylene resin (PE, MFR=0.38, density=0.963 g/cm$^3$) was melted in a 2.5 inch extruder, and supplied to an annular die using a gear pump. A die temperature was set to 260° C., and the molten polymer was cooled by blown air followed by wound into a roll. The thickness of the and the PE precursor wound to a roll (raw film) was 5 μm, respectively, and subsequently, the PP and the PE precursor were adhered together by laminating them to obtain a raw film with a three-layer structure of PP/PE/PP in this order. The raw film was annealed at 125° C. for 20 minutes. Next, the annealed film was subjected to cold stretching to 15% at room temperature, then hot stretching to 150% at 115° C., and relaxation to 103% at 125° C. to form micropores. After the aforementioned pore opening upon stretching of the film, physical properties of the separator having three layers of the microporous membranes were measured. After stretching the PP and PE layers, the layers were then delaminated, and the MFR of each layer was measured. The results are shown in Table 10.

Comparative Examples 6 and 7

A microporous membrane with a three-layer structure was manufactured and evaluated in the same manner and condition as in Example 11 not by using an ethylene/1-butene copolymer but by using the PP and PE shown in Table 10. The results are shown in Table 10.

[Heat Shrinkage Ratio]

Heat shrinkage ratio was measured for the microporous membranes manufactured in Example 2 and Comparative Example 2. The shrinking temperature was 105° C., 120° C., and 130° C., respectively. The results are shown in Table 9.

TABLE 7

| | | Examples | | | |
|---|---|---|---|---|---|
| Items | Units | 1 | 2 | 3 | 4 |
| Elastomer type | — | C2/C4 | C2/C4 | C2/C4 | SEBS |
| Hard segment Tm or Tg | °C. | 80 | 80 | 80 | 60 |
| MFR PP | g/10 min | 0.25 | 0.25 | 0.25 | 0.25 |
| Elasotmer | g/10 min | 6.7 | 6.7 | 6.7 | 4.5 |
| Microporous membrane | g/10 min | 0.35 | 0.40 | 0.43 | 0.31 |
| Elactomer content ratio | weight % | 5 | 10 | 15 | 5 |
| Thickness | μm | 14 | 11 | 15 | 14 |
| Porosity | % | 42 | 41 | 48 | 48 |
| Air permeability resistance | sec/100 ml | 252 | 270 | 350 | 243 |
| Puncture strength | gf | 431 | 452 | 440 | 432 |
| Tensile test Strength of MD direction | kg/cm$^2$ | 2010 | 2620 | 2910 | 2100 |
| Strength of TD direction | kg/cm$^2$ | 155 | 159 | 162 | 151 |
| Elastomer parallel to MD | | Present | Present | Present | Present |
| MD/TD | | ≥1.5 | ≥1.5 | ≥1.5 | ≥1.5 |

TABLE 8

| | | Comparative Exmple | | | | |
|---|---|---|---|---|---|---|
| Items | Units | 1 | 2 | 3 | 4 | 5 |
| Elastomer type | — | — | — | C2/C4 | C2/C4 | SEBS |
| Hard segment Tm or Tg | °C. | — | — | 80 | 80 | 60 |
| MFR PP | g/10 min | 0.25 | 0.80 | 0.8 | 0.25 | 0.80 |
| Elastomer | g/10 min | — | — | 6.7 | 6.7 | 4.5 |
| Microporous membrane | g/10 min | 0.28 | 0.87 | 0.40 | 0.62 | 0.65 |
| Elastomer content ratio | weight % | 0 | 0 | 10 | 25 | 5 |
| Thickness | μm | 14 | 14 | 15 | 16 | 15 |
| Porpsity | % | 44 | 46 | 43 | 28 | 47 |
| Air permeability resistance | sec/100 ml | 280 | 180 | 292 | 521 | 260 |
| Punture strength | gf | 310 | 280 | 300 | 340 | 350 |
| Tenseile test Strength of MD direction | kg/cm$^2$ | 1850 | 1540 | 1750 | 1850 | 1650 |
| Strength of TD direction | kg/cm$^2$ | 151 | 150 | 148 | 155 | 143 |
| Elastomer parallel to MD | | Absent | Absent | Absent | Present | Present |
| MD/TD | | — | — | N.D. | ≥1.5 | ≥1.5 |

TABLE 9

| | | Sample | |
|---|---|---|---|
| Temperature | Heat shrinkage ratio (%) | Comparative Example 2 | Example 2 |
| 105° C. | MD | 16.3 | 8.1 |
| | TD | −0.6 | −0.6 |
| 120° C. | MD | 26.9 | 15.0 |
| | TD | −1.3 | −1.3 |
| 130° C. | MD | 33.8 | 20.6 |
| | TD | −1.3 | −1.3 |

TABLE 10

| | | Examples | | | | Comparative Examples | |
|---|---|---|---|---|---|---|---|
| Items | Units | 5 | 6 | 7 | 8 | 6 | 7 |
| Elastomer type | — | C2/C8 | C3/C4 | C2/C4 | C2/C4 | — | — |
| Hard segment Tm or Tg | °C. | 69 | 98 | 80 | 80 | — | — |
| MFR PP | g/10 min | 0.25 | 0.25 | 0.5 | 0.25 | 0.25 | 0.25 |
| PE | g/10 min | — | — | — | 0.38 | 0.38 | 0.65 |
| Elastomer | g/10 min | 5 | 7 | 5 | 6.7 | — | — |

TABLE 10-continued

| | | Examples | | | | Comparative Examples | |
|---|---|---|---|---|---|---|---|
| Items | Units | 5 | 6 | 7 | 8 | 6 | 7 |
| PP microporous membrane | g/10 min | 0.32 | 0.3 | 0.56 | 0.32 | 0.28 | 0.25 |
| PE microporous membrane | g/10 min | — | — | — | 0.4 | 0.4 | 0.7 |
| Elastomer content | weight % | 5 | 5 | 5 | 5 | — | — |
| Thickness | μm | 14 | 13 | 13 | 14 | 13 | 15 |
| Porosity | % | 44 | 45 | 46 | 47 | 46 | 43 |
| Air permeability resistance | sec/100 ml | 232 | 228 | 196 | 266 | 257 | 283 |
| Puncture strength | Gf | 437 | 419 | 411 | 461 | 403 | 382 |
| Tensile test MD direction strength | kg/cm² | 2160 | 2090 | 1970 | 2430 | 1830 | 1550 |
| TD direction strength | kg/cm² | 151 | 152 | 148 | 160 | 142 | 140 |

By comparing Examples and Comparative Examples in terms of thickness, tensile test, heat shrinkage ratio, etc., it is indicated that the microporous membranes according to the third embodiment are excellent in product safety even when the microporous membrane is made into thin form.

REFERENCE SIGNS LIST

1 Microporous membrane (FIG. 1) or separator (FIG. 3) comprising a microporous membrane
2 Pore
3 Polymeric matrix
4 Thermoplastic elastomer
5 Fibrils
6 Needle having a hemispherical tip with a radius of 0.5 mm
7 A plate holding a separator
dia.: Diameter (11 mm) of plate opening
D: Puncture depth (mm) at maximum puncture load (puncture strength)

The invention claimed is:

1. A separator for an electric storage device, comprising a microporous membrane comprising a polypropylene resin (A) and a thermoplastic elastomer (B), wherein the microporous membrane has the following regions:
   (i) a polymeric matrix comprising the polypropylene resin (A) and the thermoplastic elastomer (B);
   (ii) fibrils comprising the polypropylene resin (A) and extending in a Machine Direction (MD) of the microporous membrane from the polymeric matrix; and
   (iii) pores between the fibrils; and
   wherein a weight ratio of the polypropylene resin (A) to the thermoplastic elastomer (B) is 99.9:0.1 to 80:20,
   wherein the region of the thermoplastic elastomer (B) is oriented along the MD of the microporous membrane, and
   wherein a Melt Flow Rate (MFR) of the microporous membrane is 1.5 g/10 minutes or less, or wherein a Melt Flow Rate (MFR) of the polypropylene resin (A) is 1.0 g/10 minutes or less, or wherein the thermoplastic elastomer (B) forms a region in which a ratio (MD/TD) of a length in the MD to a length in a Transverse Direction (TD) is 1.5 or more and 10.0 or less;
and wherein the separator has a thickness from 11 to 16 μm, and
   wherein a porosity of the microporous membrane is 37% or more and 51% or less.

2. The separator according to claim 1, wherein the thermoplastic elastomer (B) is free of propylene.

3. The separator according to claim 1, wherein the thermoplastic elastomer (B) is present in the polymeric matrix, but is not present in the fibrils.

4. The separator according to claim 1, wherein, in the case of a crystalline, thermoplastic elastomer in which a hard segment of the thermoplastic elastomer (B) is crystalline, a crystalline melting point peak of the hard segment is 50 to 110° C., or in the case of an amorphous, thermoplastic elastomer in which a hard segment of the thermoplastic elastomer (B) is amorphous, a glass-transition temperature of the hard segment is 30 to 110° C.

5. The separator according to claim 1, wherein a Melt Flow Rate (MFR) of the thermoplastic elastomer (B) is 2.0 g/10 minutes or more.

6. The separator according to claim 1, wherein the thermoplastic elastomer (B) is ethylene/α-olefin copolymer.

7. The separator according to claim 1, wherein the separator has an air permeability resistance of 100 to 500 seconds/100 ml, provided that the air permeability resistance is a value obtained by multiplying an actual measured air permeability resistance of the separator by 14 μm after dividing the actual measured air permeability resistance by a thickness of the separator.

8. The separator according to claim 1, wherein the separator has a puncture strength of 400 gf or more, provided that the puncture strength is a value obtained by multiplying an actual measured puncture strength of the separator by 14 μm after dividing the actual measured puncture strength by a thickness of the separator.

9. The separator according to claim 1, wherein a Melt Flow Rate (MFR) of the microporous membrane is 0.1 g/10 minutes or more.

10. The separator according to claim 1, wherein a Melt Flow Rate (MFR) of the polypropylene resin (A) is 0.1 g/10 minutes or more.

11. The separator according to claim 1, wherein the separator comprises a microporous multi-layered membrane in which the microporous membrane comprises the polypropylene resin (A) and the thermoplastic elastomer (B).

12. The separator according to claim 11, wherein a density of the polyethylene for the microporous membrane comprising polyethylene as a major component is 0.96 g/cm³ or more, and a Melt Flow Rate (MFR) of the microporous membrane comprising polyethylene as a major component is 0.6 g/10 minutes or less.

13. The separator according to claim 11, wherein the separator comprises not only the microporous membrane comprising the polypropylene resin (A) and the thermoplastic elastomer (B), but also the microporous multi-layered membrane and a microporous membrane comprising polyethylene as a major component are laminated.

14. The separator according to claim 11, wherein the maximum puncture strength is 20 gf/μm or more.

15. The separator according claim 11, wherein a puncture strength of the microporous membrane has at least two maximum values in a depth-strength curve of the puncture test.

16. The separator according to claim 13, wherein the maximum puncture strength is at least one of the at least two maximum values in the depth-strength curve.

17. The separator according to claim 13, wherein a Melt Flow Rate (MFR) of the microporous membrane is 1.4 g/10 minutes or less, or 0.1 g/10 minutes to 1.4 g/10 minutes.

18. The separator according to claim 11, wherein an average longest pore diameter of the microporous membrane is from 100 nm to 2000 nm.

19. The separator according to claim 11, wherein a pore diameter ratio (a/b) of an average longest pore diameter (a) of the microporous membrane to a pore diameter (b) perpendicular to the average longest pore diameter (a) is from 1.5 to 30.

20. The separator according to claim 11, wherein longest pore diameters of the microporous membrane are arranged in one direction.

21. The separator according to claim 11, wherein the maximum puncture strength is 50 gf/μm or less.

22. The separator according to claim 11, wherein the microporous membrane comprises the polypropylene resin, as well as at least one selected from the group consisting of:
    a copolymer having a branched chain; and
    a copolymer having a conjugated double bond.

23. The separator according to claim 19 wherein a Melt Flow Rate (MFR) of the polypropylene is 1.0 g/10 minutes or less.

24. The separator according to claim 19, wherein a Melt Flow Rate (MFR) of the microporous membrane is 1.5 g/10 minutes or less.

25. The separator according to claim 19, comprising:
    the polypropylene; and
    a thermoplastic elastomer being free of propylene.

26. The separator according to claim 19, wherein the separator comprises a microporous multi-layered membrane in which the microporous membrane comprising a polypropylene as a major component and a microporous membrane comprising a polyethylene as a major component are laminated.

27. The separator according to claim 1, wherein the separator has a single-layer structure or a three-layer structure.

28. The separator according to claim 1, wherein the thickness of the separator is 14 to 16 μm.

29. The separator according to claim 1, wherein the microporous membrane is made by extrusion through a circular-die.

* * * * *